(12) United States Patent
Burk et al.

(10) Patent No.: US 6,171,556 B1
(45) Date of Patent: *Jan. 9, 2001

(54) METHOD AND APPARATUS FOR TREATING AN ENGINE EXHAUST GAS STREAM

(75) Inventors: Patrick Lee Burk, Freehold; John Karl Hochmuth, Bridgewater; Joseph Charles Dettling, Howell; Ronald Marshall Heck, Frenchtown; John Joseph Steger, Pittstown; Samuel Jack Tauster, Englishtown, all of NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/154,808

(22) Filed: Nov. 19, 1993

Related U.S. Application Data

(63) Continuation-in-part of application No. 07/978,643, filed on Nov. 19, 1992, now abandoned, which is a continuation-in-part of application No. 07/974,553, filed on Nov. 12, 1992, now abandoned.

(51) Int. Cl.$^7$ ........................................................ F01N 3/28
(52) U.S. Cl. .......................... 422/173; 422/171; 422/177; 422/180
(58) Field of Search ................................... 422/171, 173, 422/175, 177, 180, 181; 60/274, 297, 286, 298; 423/213.7, 213.2, 212, 213.5, DIG. 27; 55/DIG. 30; 502/400, 77

(56) References Cited

U.S. PATENT DOCUMENTS

| | | |
|---|---|---|
| 3,067,002 | 12/1962 | Reid, Jr. ................................. 422/177 |
| 3,224,842 | 12/1965 | Manske ................................. 422/173 |
| 3,295,919 | 1/1967 | Henderson .......................... 423/213.5 |

(List continued on next page.)

FOREIGN PATENT DOCUMENTS

| | | | |
|---|---|---|---|
| 1205980 | 6/1986 | (CA) | ....................................... 60/297 |
| 1059701 | 3/1992 | (CN) . | |

(List continued on next page.)

OTHER PUBLICATIONS

M.A. Mullen et al, "Adopting . . . States", Paper No. 92–168.02, Air and Waste Management . . . , 1992, pp. 2–15.
G.K. Piotrowski, "Evaluation . . . Vehicle", EPA/AA/CTAB/88–12, 1988.

(List continued on next page.)

Primary Examiner—Hien Tran
(74) Attorney, Agent, or Firm—Richard A. Negin

(57) ABSTRACT

A method and apparatus in accordance with the invention is described which comprises treating an engine exhaust gas stream containing hydrocarbons and other pollutants. The method of this invention comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is then discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise Beta zeolites. An oxidant such as air may be added to the exhaust gas stream at a point upstream of the second catalyst zone.

25 Claims, 9 Drawing Sheets

U.S. PATENT DOCUMENTS

| | | | |
|---|---|---|---|
| 3,308,069 | * 3/1967 | Wadlinger et al. | 502/77 |
| 3,645,098 | 2/1972 | Templin et al. | 60/288 |
| 3,699,683 | 10/1972 | Tourtellotte et al. | 60/274 |
| 3,757,521 | 9/1973 | Tourtellotte et al. | 60/274 |
| 3,860,535 | 1/1975 | Johnson | 423/213.7 |
| 3,867,508 | 2/1975 | Hass | 423/213.7 |
| 3,896,616 | 7/1975 | Keith et al. | 60/274 |
| 3,910,770 | 10/1975 | Kobylinski et al. | 60/300 |
| 3,929,418 | 12/1975 | Wood | 422/172 |
| 3,929,419 | 12/1975 | Chapman | 422/172 |
| 3,929,420 | 12/1975 | Wood | 422/172 |
| 3,929,672 | 12/1975 | Ward | 502/66 |
| 3,940,301 | * 2/1976 | Straw et al. | 156/155 |
| 4,255,497 | 3/1981 | Bond et al. | 428/685 |
| 4,297,328 | 10/1981 | Ritscher et al. | 423/213.2 |
| 4,335,023 | 6/1982 | Dettling et al. | 422/180 |
| 4,430,200 | 2/1984 | Shihabi | 208/120.15 |
| 4,559,314 | * 12/1985 | Shihabi | 502/77 |
| 4,678,770 | 7/1987 | Wan et al. | 502/304 |
| 4,830,833 | 5/1989 | Shaff | 422/172 |
| 4,844,837 | 7/1989 | Heck et al. | 252/373 |
| 4,961,917 | 10/1990 | Byrne | 423/239 |
| 4,985,210 | 1/1991 | Minami | 422/169 |
| 5,010,051 | 4/1991 | Rudy | 502/304 |
| 5,016,438 | 5/1991 | Harris | 60/299 |
| 5,043,147 | 8/1991 | Knight | 422/180 |
| 5,051,244 | 9/1991 | Dunne et al. | 423/212 |
| 5,058,380 | 10/1991 | Pelters et al. | 60/288 |
| 5,067,319 | 11/1991 | Moser | 60/288 |
| 5,078,979 | 1/1992 | Dunne | 423/212 |
| 5,089,236 | 2/1992 | Clerc | 422/177 |
| 5,125,231 | 6/1992 | Patil et al. | 60/274 |
| 5,130,099 | 7/1992 | Schatz | 422/175 |
| 5,140,811 | 8/1992 | Minami et al. | 60/297 |
| 5,142,864 | 9/1992 | Dunne | 60/274 |
| 5,158,753 | 10/1992 | Take et al. | 422/173 |
| 5,184,462 | 2/1993 | Schatz | 60/274 |
| 5,303,547 | * 4/1994 | Mieville et al. | 60/274 |

FOREIGN PATENT DOCUMENTS

| | | | |
|---|---|---|---|
| 3928760 | 8/1989 | (DE) | F01N/3/02 |
| 4033827 | 5/1991 | (DE) | F01N/3/28 |
| 0040276 | 11/1981 | (EP) | C01B/33/28 |
| 0424966 | 10/1990 | (EP) | F01N/3/20 |
| 0460542 | 5/1991 | (EP) | F01N/3/20 |
| 458414 | * 11/1991 | (EP) . | |
| 0485179 | 5/1992 | (EP) | F01N/3/20 |
| 0490037 | 6/1992 | (EP) | B01J/20/18 |
| 0 592 713 A1 | 4/1994 | (EP) | F01N/3/20 |
| 2213097 | 8/1974 | (FR) . | |
| 0257710 | 10/1989 | (JP) | 60/297 |
| 2111438 | 4/1990 | (JP) . | |
| 2126937 | 5/1990 | (JP) . | |
| 2135126 | 5/1990 | (JP) | B01D/53/26 |
| 2211245 | 8/1990 | (JP) | B01D/53/34 |

OTHER PUBLICATIONS

R.G. Hurley, et al, "Evaluation . . . Vehicle", SAE 900504, 1990.

R.G. Hurley et al., "Experiences . . . Catalysts", SAE 912384, 1991.

L.S. Socha et al, "Electrically . . . Vehicles", SAE 920093, 1992.

K. Otto et al, "Adsorption . . . Silicalite", I&EC Research, 30, p 2333, 1991.

M.J. Heimrich et al, "Cold . . . Control", SAE 920847, 1992.

J. Keebler, "Device . . . Work", Automotive News, p 35, Jul. 27, 1992.

J. Keebler, "Makers . . . Emissions", Automotive News, p 35, Jul. 27, 1992.

G.F. Taylor et al, "The Adsorption . . . Catalysts", Journal of Catalysts, 150–156, Oct., 1968.

Jula A. Rabo 'Zeolite Chemistry and Catalysis ACS Monograph 171', 1976, American Chemical Society, Washington, DC—pp. 246–260.

* cited by examiner

METHOD AND APPARATUS FOR TREATING AN ENGINE EXHAUST GAS STREAM

CROSS-REFERENCE TO RELATED APPLICATIONS

This application is a continuation-in-part of U.S. Ser. No. 07/978,643 filed Nov. 19, 1992, now abandoned which is a continuation-in-part of U.S. Ser. No. 07/974,553 filed Nov. 12, 1992, now abandoned, both herein incorporated by reference.

BACKGROUND OF THE INVENTION

1. Field of the Invention

This invention relates to the treatment of an engine exhaust gas stream, and more specifically to a method and apparatus for treating an engine exhaust gas stream containing pollutants including unburned hydrocarbons.

2. The Related Art

Molecular sieves, including zeolites, have been found to be useful for adsorbing harmful components such as hydrocarbons from gaseous streams containing these and other pollutants. For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2 of U.S. Pat. No. 4,985,210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled *Cold-Start Hydrocarbon Collection for Advanced Exhaust Emission Control*, SAE Publication Number 920847, discloses an apparatus which functions in a manner similar to that of U.S. Pat. No. 5,051,244.

U.S. Pat. No. 5,125,231 to Patil et al, dated Jun. 30, 1992, discloses an engine exhaust system for reducing hydrocarbon emissions, including the use of Beta zeolites as hydrocarbon adsorbents (see column 5, lines 63 through column 6, line 14). Zeolites having a silica/alumina ratio in the range of 70/1 to 200/1 are preferred adsorbents (see column 6, lines 7–11). The apparatus includes by-pass lines and valves to direct exhaust gases from a first converter directly to a second converter during cold-start operation and when the first converter reaches its lightoff temperature, to either by-pass the second converter or recycle effluent from it to the first converter (see e.g., column 10, lines 10–28).

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

SUMMARY OF THE INVENTION

The present invention relates to an apparatus and method for treating engine exhaust gases employing an apparatus having a first and a second catalyst zone and an adsorbent zone between them, wherein the first and second catalyst zones are in heat transfer relation to one another. Heat transfer from the first catalyst zone to the second catalyst zone helps to bring the second catalyst therein more quickly to its effective operating temperature, and the adsorbent zone reduces the quantity of hydrocarbons discharged to the atmosphere by adsorbing them until the second catalyst is at a temperature at which it can more effectively convert at least some of the hydrocarbons to innocuous substances.

Specifically, the present invention provides a method of treating an engine exhaust gas stream containing hydrocarbons and other pollutants at least during a cold-start period of operation. The method comprises the steps of (a) flowing the exhaust gas stream through a first catalyst zone having therein a first catalyst effective at least for the conversion of some of the pollutants to innocuous products; (b) flowing the effluent of the first catalyst zone through an adsorbent zone comprising an adsorbent effective to temporarily adsorb at least some hydrocarbons remaining in the gas stream; and (c) flowing the effluent of the adsorbent zone through a second catalyst zone comprising a second catalyst effective at least for the conversion of at least some of the hydrocarbons to innocuous products. In the process of the invention, heat is transferred from the first catalyst zone to the second catalyst zone, to improve the efficacy of the second catalyst zone at least during the cold-start period of engine operation.

According to one aspect of the present invention, the exhaust gas stream may be flowed through an indirect heat exchange means which may comprise a crossflow monolith having a first plurality of passages defining a first flow path through the monolith and disposed in heat exchange relationship with a second plurality of passages defining a second flow path through the monolith which is segregated from the first flow path. The first catalyst zone and the second catalyst zone may be disposed in the respective first and second flow paths of the crossflow monolith. The first catalyst may comprise an oxidation catalyst, and the method may comprise oxidizing carbon monoxide to carbon dioxide in the first catalyst zone.

Another aspect of the invention provides that a third catalyst zone may comprise a third catalyst effective for the oxidation of hydrocarbons and be disposed between the first and second catalyst zones, and the method may comprise flowing the exhaust gas stream through the third catalyst zone.

Another aspect of the invention provides that the adsorbent material may comprise a molecular sieve material, for example, a molecular sieve material selected from the group consisting of faujasite, chabazite, silicalite, zeolite X, zeolite Y, ultrastable zeolite Y, offretite, and Beta zeolites. In particular, ion-exchanged Beta zeolites may be used, such as Fe/Beta zeolite, or preferably, H/Beta zeolite. The zeolites, preferably Beta zeolites may have a silica/alumina molar ratio of from at least about 25/1, preferably at least about 50/1, with useful ranges of from about 25/1 to 1000/1, 50/1 to 500/1 as well as about 25/1 to 300/1 for example, from about 100/1 to 250/1, or alternatively from about 35/1 to 180/1. Other useful and preferred silica to alumina molar ratios for zeolites are at least 200/1 with more preferred ratios of from about 200/1 to about 1000/1, and Beta zeolite ratio ranges preferably from about 200/1 to about 600/1. Most preferably, the adsorbent material is a low zeolite having a relative Bronsted acidity, as defined below, of less than 1.0, preferably less than 0.5, more preferably less than 0.25, yet more preferably less than 0.1 and most preferably less than 0.05.

Preferred zeolites, include ZSM, Y and Beta zeolites, with Beta zeolites particularly preferred. The preferred zeolites are treated to reduce the number of acid sites. This can be accomplished by leaching the zeolite with an organic or inorganic acid. The zeolite alternatively or additionally can be steam treated with steam at from 350 to 900° C. with the steam temperature increasing at from 100 to 600° C. degrees per hour. Steam treatment has been found to reduce the relative Bronsted acidity, and result in an increase the durability of the zeolite when used in hydrocarbon adsorption applications in exhaust gas streams.

The present invention includes adsorbent compositions comprising zeolites treated to have the above recited preferred relative Bronsted acidity ranges, exhaust gas, purifying apparatus and adsorbers comprising such compositions.

Still another aspect of the invention comprises adding an oxidant to the exhaust gas stream at a point up-stream of the second catalyst zone, for example, at a point between the first catalyst zone and the second catalyst zone. When the exhaust gas stream is flowed through the intermediate catalyst zone, the oxidant is preferably added upstream thereof. The oxidant typically comprises oxygen which may conveniently be provided by the addition of air to the exhaust gas stream.

Optionally, the method may comprise flowing the exhaust gas stream through a preliminary catalyst zone disposed upstream of and in gas flow communication with the first catalyst zone. The preliminary catalyst zone may comprise a catalytic composition comprising at least one platinum Group metal, for example, a palladium catalyst component.

The invention also includes an apparatus aspect and provides an exhaust gas purifying apparatus for converting noxious components such as hydrocarbons and other pollutants from an engine exhaust gas stream into innocuous products. The apparatus according to this aspect of the invention defines a flow path for the exhaust gases and comprises a first catalyst zone comprising a first catalyst effective for the conversion of at least some of the pollutants into innocuous substances; an adsorbent zone disposed in gas flow communication with and downstream of the first catalyst zone and comprising an adsorbent for temporarily adsorbing at least some hydrocarbons in the gas stream, at least during a cold-start period of engine operation; and a second catalyst zone disposed in gas flow communication with and downstream of the adsorbent zone and comprising a second catalyst for converting at least some unburned hydrocarbons into innocuous substances. The apparatus also comprises heat exchange means for providing heat transfer by indirect heat exchange from the first catalyst zone to the second catalyst zone.

According to one aspect of the invention, the heat exchange means comprises a crossflow monolith defining first and second zones therein in mutual heat exchange relation to one another. Preferably, the first zone comprises the first catalyst zone and the second zone comprises the second catalyst zone. The first catalyst may be effective at least for the oxidation of carbon monoxide. According to one aspect of the invention, at least one of the first and second catalysts is a three-way catalyst (TWC), for example, the first catalyst may be a three-way catalyst.

The apparatus may further comprise an intermediate catalyst zone disposed between, and in gas flow communication with, the adsorbent zone and the second catalyst zone, the intermediate catalyst zone comprising a third catalyst effective at least for the oxidation of hydrocarbons. The intermediate catalyst zone can be upstream or downstream of the adsorbent zone.

According to yet another aspect of the invention, the apparatus may comprise a preliminary catalyst zone disposed upstream of and in gas flow communication with the first catalyst zone. The preliminary catalyst zone may comprise a catalyst composition comprising, for example, a palladium catalytic component.

Another aspect of the invention provides that the adsorbent material may comprise a zeolite, preferably a Beta zeolite adsorbent material as described above. Thus, the invention may comprise an exhaust gas purifying apparatus and method for converting noxious components such as hydrocarbons and other pollutants from an engine exhaust gas stream into innocuous products, the apparatus defining a flow path for the exhaust gases. According to this aspect of the invention, the apparatus may comprise an adsorbent zone disposed in the flow path for temporarily adsorbing unburned hydrocarbons from the exhaust gas stream and comprising Beta zeolite. The apparatus further comprises a catalyst zone disposed in the flow path downstream of the adsorbent zone, comprising a catalyst effective for the conversion of at least some of the pollutants and desorbed unburned hydrocarbons into innocuous substances. The Beta zeolite may be an ion-exchanged Beta zeolite such as H/Beta zeolite or Fe/Beta zeolite. Preferably, there is a heat exchange means for providing heat transfer by indirect heat exchange from the flow path upstream of the adsorbent zone to the catalyst zone downstream of the adsorbent zone.

According to another aspect of the invention, an apparatus comprising first and second catalyst zones in heat exchange relation to one another with an adsorbent zone between them may further comprise means for adding an oxidant to the exhaust gas stream at a point upstream of the second catalyst zone, for example, at a point between the first and second catalyst zones. When the apparatus comprises the intermediate catalyst zone, the means for adding an oxidant to the exhaust gas stream preferably adds the oxidant at a point upstream of the intermediate catalyst zone, for example, at a point between the adsorbent zone and the intermediate catalyst zone. The oxidant typically comprises oxygen and may comprise air; the means for adding the oxidant may therefore comprise an air pump.

A crossflow monolith comprising the first catalyst zone and the second catalyst zone according to the present invention may be configured to provide a geometric surface area per unit volume of from about 3 to 35 $cm^2/cm^3$ in the first zone and a geometric surface area per unit volume of from about 3 to 35 $cm^2/cm^3$ in the second zone. Such a configuration may be provided, for example, by a monolith having from about 9 to about 800 gas flow passages per cross-sectional square inch in the first zone and from about 9 to about 800 gas flow passages per cross-sectional square inch in the second zone. For example, the monolith may be configured to provide about 400 passages per cross-sectional square inch in the first zone and about 100 passages per cross-sectional square inch in the second zone.

As used herein and in the claims, reference to a "first" catalyst, zone, or catalyst zone and a "second" catalyst, zone, or catalyst zone is made with reference to the sequence of introduction therein of an exhaust gas stream to be treated. Thus, the "first" catalyst is the upstream catalyst and the "second" catalyst is the downstream catalyst with "upstream" and "downstream" being as sensed in the direction of the flow of the exhaust gas stream therein.

The term "indirect heat exchange" is used herein and in the claims to indicate heat exchange comprising conduction through a solid medium, e.g., the walls of a heat exchanger or a crossflow monolith, rather than heat exchange achieved solely by the intermingling of fluids or gases of different temperatures, or by convection.

DETAILED DESCRIPTION OF THE INVENTION AND PREFERRED EMBODIMENTS THEREOF

Figure 1:
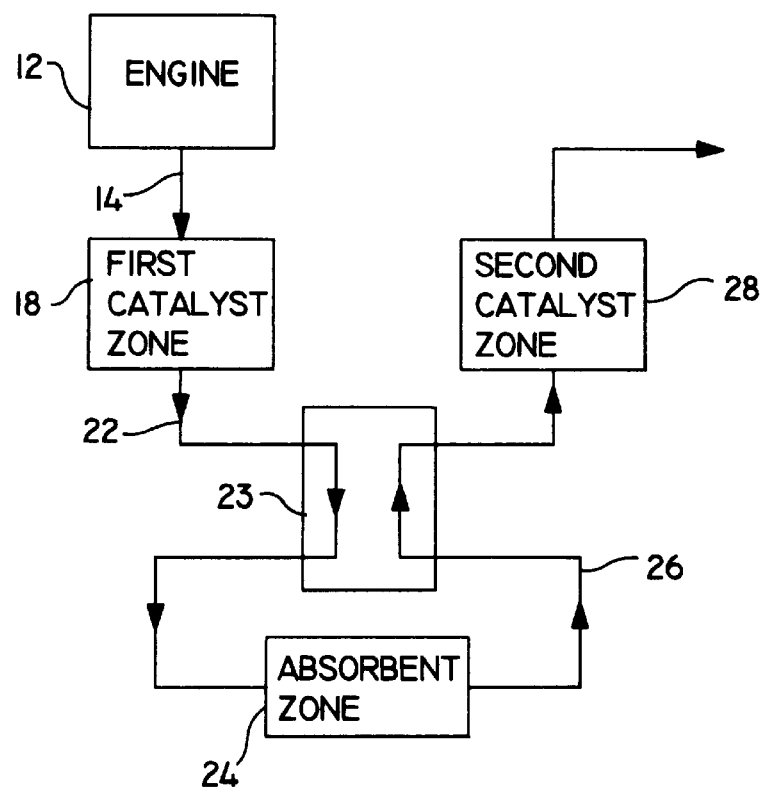
FIG. 1 is a schematic flow diagram of an exhaust apparatus comprising discrete first and second catalyst zones disposed upstream and downstream, respectively, of a heat exchanger according to one embodiment of the present invention.

The method and apparatus of this invention are particularly suited for minimizing noxious emissions from an engine exhaust gas stream during the cold-start operation of an internal combustion engine. Such engines are fueled by hydrocarbonaceous fuels and are known to emit a variety of noxious pollutants in their exhaust gases. The hydrocarbons in such fuel generally comprise gasoline or diesel fuel, but sometimes comprise alcohols, including ethanol and methanol. Mixtures of these above-mentioned fuels can also be used. Thus, the exhaust gas stream from such an engine contains pollutants such as hydrocarbons, $NO_x$ and carbon monoxide, which must be removed prior to discharging the exhaust gas stream into the atmosphere to comply with State and/or Federal Government exhaust emission standards. The problem of controlling the emission of these pollutants, particularly hydrocarbons, is most acute during the cold-start period of engine operation, during which the engine may be cold, (i.e., below standard operating temperature) and during which any environmental catalyst used to convert the pollutants to innocuous substances may be below its operating temperature. The present invention provides a method and apparatus for reducing the emission of unburned hydrocarbons during and after the cold-start period of engine operation. Broadly described, this is achieved by providing an exhaust gas treatment apparatus comprising two catalyst zones and a hydrocarbon trap between them, and transferring heat from the first catalyst zone to the second catalyst zone at least during the cold-start period of engine operation.

According to the present invention, a first catalyst zone is disposed in gas flow communication with the engine to receive exhaust gases from the engine. The first catalyst zone contains a catalyst effective to convert at least some of the pollutants in the gas stream, e.g., carbon monoxide, into innocuous products. The first catalyst may be effective for the conversion of other pollutants as well, e.g., it may be a conventional three-way catalyst effective for the conversion of carbon monoxide unburned hydrocarbons and nitrogen oxides to innocuous substances. Such catalysts generally comprise one or more platinum group metals. Optionally, the platinum group metals are supplemented with one or more base metals of Group VII and metals of Group VB and/or VIB of the Periodic Table of Elements. Preferably, one or more of chromium, copper, vanadium, cobalt, nickel and iron may thus be employed. These catalysts also include the types generally known as three-way conversion or TWC catalysts. These TWC catalysts may comprise, for example, platinum-rhodium or palladium-rhodium bimetallic components or platinum-palladium-rhodium trimetallic components deposited on a refractory metal oxide such as alumina, ceria or zirconia.

An adsorbent zone is disposed downstream of and in gas flow communication with the first catalyst zone and contains an adsorbent material effective to adsorb hydrocarbons in the exhaust gas stream at least during the cold-start period of operation. During this period, the gas stream is laden with unburned hydrocarbons, and one or both of the first catalyst and the second catalyst may be ineffective to convert unburned hydrocarbons, which pass through unaffected. The adsorbent material in the adsorbent zone, by adsorbing the hydrocarbons, at least temporarily prevents the release of unburned hydrocarbons into the atmosphere.

The adsorbent material may include any known hydrocarbon adsorbent such as activated alumina, porous glass, silica gel and activated carbon. Natural and synthetic molecular sieves are particularly effective. Natural molecular sieves include faujasites, clinoptilolites, mordenites and chabazites. Zeolites, a class of molecular sieves, which can be used include silicalite, zeolite X, zeolite Y, ultrastable zeolite Y, ZSM-5, offretite and the like. Generally, sieve materials having so-called three dimensional pore configurations are preferred over sieve materials having one- or two-dimensional pore configurations, although some of the latter function acceptably well. Acceptable materials typically have a micropore diameter of from about 3 to 8 angstroms. Unexpectedly, Beta zeolites have been shown to be particularly effective adsorbents, especially those having high silica/alumina ratio ranges of about 25/1 to 300/1, and from about 100/1 to about 250/1. The zeolites, preferably Beta zeolites may have a silica/alumina molar ratio of from at least about 25/1, preferably at least about 50/1, with useful ranges of from about 25/1 to 1000/1, 50/1 to 500/1 as well as about 25/1 to 300/1 for example, from about 100/1 to 250/1, or alternatively from about 35/1 to 180/1. Other useful and preferred silica to alumina molar ratios for zeolites are at least 200/1 with more preferred ratios of from about 200/1 to about 1000/1, and Beta zeolite ratio ranges preferably from about 200/1 to about 600/1. The preferred Beta zeolites are ion-exchanged Beta zeolites, such as H/Beta zeolite and Fe/Beta zeolite.

Preferred zeolites, include ZSM, Y and Beta zeolites, with Beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoro acetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfuric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite can be steam treated with steam at from 350 to 900° C. Preferably, the stream treatment is conducted at from 400 to 800° C., and more preferably 500 to 750° C. with a most preferred range being from 550 to 750° C. The steam temperature can be increased at a suitable rate such as from 100 to 600 degrees per hour. Disclosed steam concentration is from 10 to 100% and preferably 30 to 100% with a preferred concentration at from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment does not significantly increase the silica to alumina ratio. However, it is believed to reduce the acidity of the zeolite by removing at least some of the aluminum from the framework of the zeolite. Steam treated zeolites have been found to increase the durability of zeolites when used to adsorb hydrocarbons in gaseous streams and to resist coke formation. Preferably, the zeolite can be treated with both leaching and steam treatment. In a particularly preferred process, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed and leached again.

A useful method to treat Beta zeolite is disclosed, for example in CN 1059701A, published Mar. 25, 1992 and herein incorporated by reference. This reference discloses a high Si Beta zeolite produced by calcining to remove nitrogen compounds from a Beta zeolite made through an organo-amine template process. Leaching the Beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. degrees per hour. Disclosed steam concentration is 100% at a system pressure of 50 to 500 KPa. The duration of the steam treatment is from 0.5 to 5 hours.

In accordance with a preferred embodiment of the present invention, zeolites can be used which are treated to increase the silica to alumina ratio supplemented by steam treatment. Methods to increase the silica to alumina ratio result in removal of the alumina from the zeolite. Leaching for example removes aluminum from the framework of the zeolite structure. The removed aluminum in the form of aluminum ion salt is removed with the leaching liquor.

Of particular interest with regard to the present invention is the acidity which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite after steaming has been found to have improved coking resistance. It is believed that the steaming preferentially removes Bronsted acid sites from the zeolite framework. After the steaming step, it has been found that the formation of coke during engine testing has been significantly reduced. Therefore, a zeolite with relatively less Bronsted acid sites than a comparable zeolite having the same silica to alumina ratio, even considering only the silica to alumina ratio in the zeolite framework will result in a more stable (to coke formation) adsorbent material to hydrocarbons in an exhaust steam. It has been found that while the overall acidity, and the silica to alumina ratio may be an important indicators of adsorbent properties, the relative Bronsted activity is also significant.

A zeolite with reduced Bronsted acidity can be made by suitable means, with a preferred method to reduce Bronsted acid sites being steam treatment as recited above. A typical Bronsted acid structure is:

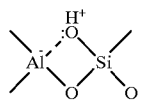

Relative Bronsted acid site concentration can be measured by Infra-red spectroscopic adsorption peaks. A useful procedure to measure such peaks can be conducted using a Perkin-Elmer 1750 FTIR spectrometer. Approximately 0.5 grams of sample is placed in a Spectra Tech Environmental chamber cell and examined in-situ under constant nitrogen flow. The sample is initially heated to 450° C. to remove all water. The sample is cooled to 40° C. and pyridine vapor is introduced under nitrogen flow into the chamber. The sample is kept at 40° C. for 50 minutes to reach equilibrium. Next the sample is heated under a flow of nitrogen to 200° C. for one hour, cooled, and scanned to take measurements of the 1546 $cm^{-1}$ peak for a Bronsted acid and the 1455 $cm^{-1}$ peak for a Lewis acid. The relative Bronsted acidity is determined by a ratio of the Bronsted acidity structure peak heights after process to affect it, preferably steaming to a reference material. For the purpose of this invention, the reference material is a zeolite having a silica to alumina molar ratio of 180/1. Zeolites useful for the present invention have a relative Bronsted acidity of less than 1.0, preferably less than 0.5, more preferably less than 0.25, yet more preferably less than 0.1 and most preferably less than 0.05. Relative Lewis acidity can be determined annalogously.

While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. Therefore, the silica to alumina ratio of the zeolite particle, or even the zeolite framework is not the only parameter for zeolites to be used in the adsorption of hydrocarbons at exhaust stream conditions; but rather the Bronsted acidity. The importance of this can be recognized by both more effective resistance to coking under exhaust gas conditions (300 to 1000° C.), and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

The adsorbent material of the present invention is a composition which comprises a molecular sieve, preferably a zeolite and most preferably a Beta zeolite as recited above and a binder also referred to as a washcoat binder. Washcoat binders typical for use in the formulation of slurries include but are not restricted to the following: sols of alumina, silica, ceria and zirconia; inorganic and organic salts and hydrolysis products thereof of aluminum, silicon, cerium and zirconium such as nitrates, nitrites, halides, sulfates and acetates; hydroxides of aluminum, silicon, cerium, zirconium, and mixtures of all of the above components. Also useful as binders are organic silicates which are hydrolyzable to silica include tetraethyl orthosilicates.

The relative proportions of zeolite and binder can range from about 1 to 20 percent by weight and preferably from about 5 to about 15 weight percent. A preferred composite comprises about 90 weight percent Beta Zeolite and about 10 weight percent of a silica sol. Preferably, the silica sol has substantially no alumina.

The adsorbent material may be deposited onto a solid monolithic carrier by methods known in the art. It is usually most convenient to apply the adsorbent as a thin film or coating deposited on an inert carrier material which provides the structural support for the adsorbent. The inert carrier material can be any refractory material such as ceramic or metallic materials. Alternatively, as is known in the art, the adsorbent may be provided in the form of pellets or beads disposed in a flow-through canister to provide an adsorbent bed through which the exhaust gases flow. In still other embodiments, the adsorbent material may be extruded or otherwise fabricated into monolithic form and disposed within the exhaust gas stream.

The amount of adsorbent components of the composition can be varied based on factors including the specific hydrocarbons to be adsorbed, the specific zeolite and binder combination and concentrations, the conditions of the stream containing the hydrocarbons and the like. Typically, an adsorbent composition is in an aqueous slurry form having 5 to 50, preferably 10 to 40 weight percent solids, for use to coat a monolith, such as a honeycomb. The resultant monolith preferably is coated with the adsorbent composition and preferably has from 0.3 to 3.0 $g/in^3$ and preferably 0.5 to 2.5 $g/in^3$ of coating based on the amount of zeolite adsorber compound.

A second catalyst zone is disposed in gas flow communication with, and downstream of, the adsorbent zone. The second catalyst zone contains a catalyst effective to at least oxidize unburned hydrocarbon pollutants to innocuous components. Such catalysts are well-known in the art and typically comprise a catalytically active species, such as a platinum group metal, dispersed on a relatively inert refractory support material such as stabilized, activated alumina. The second catalyst may be the same as or different from the catalyst in the first catalyst zone, e.g., it may be of the TWC catalyst type. Catalysts which are well-known in the art for oxidizing pollutants in engine exhaust gas streams include one or more of platinum, palladium and rhodium either singly or in combination, as well as a number of base metals such as copper, chromium, etc. The catalytically active metal, whether a precious metal or a base metal, or a combination thereof, is typically dispersed on a refractory support material such as alumina, ceria, zirconia, etc.

According to the present invention, means are provided to transfer heat from the first catalyst zone to the second catalyst zone, to bring the second catalyst more quickly to its effective operating temperature. Those skilled in the art will appreciate that the invention as described herein can be practiced in a number of variations. For example, the first catalyst zone and the second catalyst zone may each comprise discrete carrier monoliths, and heat exchange between them may be achieved by disposing the discrete monoliths in heat exchange relation to one another. Alternatively, heat exchange may be accomplished using a conventional heat exchange member, i.e., a heat exchanger, disposed downstream of the first catalyst zone and upstream of the second catalyst zone, whereby indirect heat exchange takes place between the heated effluent of the first catalyst zone and the influent of the second catalyst zone. Preferred embodiments of the invention comprise a crossflow monolith having a first and a second zone in mutual heat exchange relation to one another as described below, in place of a conventional heat exchanger. More preferably, the first catalyst zone and the second catalyst zone are disposed in the respective first and second zones of the crossflow monolith.

In use, the exhaust gas stream from an engine is flowed into the inlet of the first catalyst zone and comes into contact with the first catalyst. At least during the cold-start period, the first catalyst may not be effective to convert any pollutants to innocuous substances, or may convert only a small portion of the pollutants in the gas stream. During this time, the large quantity of unburned hydrocarbons produced by the engine flows through the first catalyst zone and into the adsorbent zone, where the hydrocarbons are adsorbed onto the adsorbent material. The exhaust gas stream, thus having substantially reduced quantities of unburned hydrocarbons, flows from the adsorbent zone to the second catalyst zone where it comes into contact with a catalyst effective, when heated to an appropriate temperature, for the conversion of hydrocarbon pollutants to innocuous substances. However, like the first catalyst, the second catalyst is not likely to be effective at the temperatures that prevail during the cold-start period of operation.

Over the course of from about one to five minutes of engine operation immediately following a cold-start, the rising temperature of the exhaust gases as they exit the engine and/or the exothermic partial activity of the first catalyst heats the first catalyst zone. This heat is transferred to the second catalyst zone, which accordingly exhibits an improved conversion efficiency. The transfer of heat from the first catalyst zone to the second catalyst zone also tends to reduce the heat content of the effluent of the first catalyst zone flowing toward the adsorbent zone, and thus reduces the tendency of the exhaust gases to desorb hydrocarbons from the adsorbent zone prematurely.

As engine operation progresses, increasing quantities of heat flow with the exhaust gases to the adsorbent zone, and the hydrocarbon concentration of the exhaust gases decreases. Accordingly, the previously adsorbed hydrocarbons begin to desorb from the adsorbent zone and flow toward the second catalyst zone. However, since the second catalyst zone is, by then, closer to its operating temperature than it was earlier in the cold-start period, a significant quantity of the desorbed, unburned hydrocarbons are converted in the second catalyst zone to innocuous substances. Thus, hydrocarbons which otherwise would flow unaffected through both the first catalyst zone and the second catalyst zone to be discharged into the atmosphere are adsorbed within the apparatus until such time as the second catalyst can effectively convert at least some of the hydrocarbons to innocuous substances. As a result, the emission of hydrocarbons during the cold-start period of engine operation is significantly reduced by means of an apparatus which is free from moving parts such as valves and redundant structures such as by-pass piping.

In another embodiment of this invention, air or another oxidant may be added to the system by suitable means to facilitate oxidation of the unburned hydrocarbons in the exhaust gas stream discharged from the adsorbent zone. The air may be added as needed to the exhaust gas stream at any point upstream of the second catalyst zone and, preferably, downstream of the first catalyst zone. Preferably, the air is added upstream of the adsorbent zone since this helps to cool the adsorbent zone and thus inhibit premature desorption of hydrocarbons.

In another embodiment of this invention, a third or intermediate catalyst zone may be disposed between, and in gas communication with, the adsorbent zone and the second catalyst zone. Preferably, the catalyst in the intermediate catalyst zone is an oxidation catalyst, such as are well-known in the art, which facilitates the oxidation of the hydrocarbons and/or carbon monoxide. In using this embodiment of the invention, air may be added by suitable means to the exhaust gas stream at a point preferably up-stream of the intermediate catalyst zone.

As discussed above, a crossflow monolith or support may be used to transfer heat from the first catalyst zone to the second catalyst zone. As will be appreciated by those skilled in the art, the term "monolith body", "support" or "member" is meant to include and encompass a honeycomb body support or structure. By the expression "crossflow" monolith body or member, or honeycomb body or member, is conventionally meant that the direction of the flow of the exhaust gas stream through the second zone is crosswise to that through the first zone, although other configurations are possible and are intended to be referred to and included by the term "crossflow". Generally, a crossflow monolith provides a first plurality of gas flow channels to comprise a first zone, which passages do not allow gas flow communication with, but are positioned in heat exchange relation to, a second plurality of gas flow channels to comprise a second zone. Such a crossflow monolith generally may be configured to have opposing end faces and opposing side faces such that the gas flow channels or passages comprising the first zone extend therethrough from one end face of the monolith to the other to provide gas flow communication through the body. Similarly, gas flow channels or passages comprising the second zone extend through the monolith from one side face to the other, crosswise to the channels in the first zone, likewise to provide gas flow communication through the body. However, in alternative embodiments a monolith in which the first and second plurality of channels are in parallel, heat exchange relation to one another is also considered to fall within the term "crossflow monolith" as used herein. Such alternative crossflow monoliths may dispose the inlets and outlets of respective first and second zones in physically distinct groupings so that gas streams can be selectively directed through one zone or the other by the use of strategically positioned manifolds.

In a particular embodiment of the invention, the crossflow monolith body may be configured so that the channels of the first zone are arranged in a plurality of layers or strata which are interdispersed between layers of channels of the second zone. These alternating layers may be flat or formed to have corrugations defined by corrugated materials, or combinations of corrugated and flat materials. The composition of the material may be any suitable material such as refractory metals, e.g., stainless steel, Kanthal, Fecralloy, etc. With the channels of the first and second zones disposed in this way within a single monolith, any heat in the first zone will be transferred through indirect heat exchange to the second zone. Thus, the use of a crossflow monolith provides first and second zones in heat exchange relation to each other.

The gas flow channels or passages may have any of a variety of cross-sectional configurations, e.g., they may be triangular, rectangular, square, sinusoidal or circular in cross section. The gas flow channels or passages may have corners which are filleted or rounded such as described in U.S. Pat. No. 4,335,023.

Since the gas flow passages of the first zone do not intersect with or provide gas flow communication with the gas flow passages in the second zone, means must be provided for flowing the exhaust gas from the first zone to the second zone. Conventionally, this is accomplished by providing manifolds at the outlet end face of the first zone and the inlet side face of the second zone and a gas flow conduit to provide gas flow communication between the manifolds. The adsorbent zone is preferably disposed within the gas flow conduit, as may be other, optional components of the invention, as will be discussed below.

As indicated above, it is preferred that the first and second zones of the crossflow monolith comprise the first and second catalyst zones, respectively. In such embodiments, the monolith body, member or support may be configured so that the walls of the gas flow passages in the first zone have a cumulative geometric surface area per unit volume of from about 3 to about 35 cm$^2$ per cubic centimeter of the monolith, i.e., from about 3 to about 35 cm$^2$/cm$^3$, and so that the walls of the gas flow passages of the second zone likewise have a cumulative geometric surface area per unit volume of from about 3 to 35 cm$^2$/cm$^3$. Such a configuration may be achieved, for example, by providing a monolith having from about 9 to 800 gas flow channels per cross-sectional square inch in each respective zone, the length of the monolith being adjusted to provide the desired channel wall surface area. However, support monoliths are now available having from 800 to 1000 gas flow channels per cross sectional square inch, and these monoliths may also be used in the practice of the present invention. It should be noted that the cell density of monoliths used in the practice of the present invention is not a limitation on the invention. Surface areas in this range facilitate heat transfer between the zones and also provides adequate surfaces for the support of catalyst washcoats when the crossflow monolith comprises one or more catalyst zones. In a specific example, the monolith body may be configured to provide about 400 passages per cross-sectional square inch in the first plurality of passages and about 100 passages per cross-sectional square inch in the second plurality of passages. Flat members may provide common walls between the channels in different directions.

Monolith or honeycomb bodies, supports or members which are suitable for the catalytic member in the method and apparatus of this invention are well-known in the art and may be constructed of metal or of a substantially chemically inert, substantially catalytically-inactive, rigid, solid material. Such materials include zircon-mullite, alpha-alumina, sillimanite, magnesium silicate, zircon, perlite, spodumene, cordierite, alumino-silicate and mullite, with cordierite preferred.

Generally, the adsorbent zone should not be positioned so close to the engine outlet that the adsorbent zone is subjected to exhaust gas temperatures high enough to desorb hydrocarbons trapped therein prematurely, i.e., before the catalyst downstream of the absorbent zone attains an effective operating temperature. Tests have shown that a trap placed in the underfloor position of a conventional automotive exhaust system adsorbed hydrocarbons effectively for only about sixty seconds, and desorbed hydrocarbons well before the end of cycle 1 of the FTP test described below. However, a trap placed in the tail pipe retained hydrocarbons beyond the first two minutes of the test. Of course, it is necessary to position the trap upstream of a hydrocarbon conversion catalyst so that when the hydrocarbons are finally desorbed, they are converted to innocuous substances. Accordingly, the adsorbent zone should preferably be positioned at a location in the engine exhaust system which is upstream of a hydrocarbon conversion catalyst but which is also removed as far as is feasible from the engine so that the exhaust gases may cool somewhat before entering the adsorbent zone. By so positioning the adsorbent zone and by providing heat exchange between first and second catalyst zones as described herein, the retention of adsorbed hydrocarbons by the adsorbent during initial cold-start operation is prolonged.

Various embodiments of the present invention are shown in the Figures. For example, FIG. 1 illustrates a broad aspect of the invention wherein engine 12 discharges an exhaust gas stream containing pollutants such as hydrocarbons and other pollutants which flow through exhaust pipe 14 to a catalytic member comprising a first catalyst (not shown) to provide a first catalyst zone 18. The exhaust gas is thereafter discharged from the first catalyst zone 18 and is flowed via exhaust pipe 22 through a heat exchanger 23 to adsorbent zone 24 which contains an adsorbent therein (not shown). The exhaust gas then flows from adsorbent zone 24 via exhaust pipe 26, again through heat exchanger 23 and then through a discrete second catalyst zone 28.

During the cold-start period of operation, unburned hydrocarbons pass through first catalyst zone 18 and are carried in the effluent through heat exchanger 23 to adsorbent zone 24, where they are adsorbed from the exhaust gas stream. The gas stream then flows through exhaust pipe 26, once again through heat exchanger 23 to second catalyst zone 28. As engine operation progresses, the first catalyst zone 18 begins to heat up, as does the effluent therefrom. As described above, the heat exchanger 23 transfers heat from the heated effluent of the first catalyst zone to the influent of second catalyst zone 28 which heats second catalyst zone 28. In this way, heat is transferred from first catalyst zone 18 to second catalyst zone 28, increasing the activity of the second catalyst and cooling the influent to adsorbent zone 24 to inhibit premature desorption of hydrocarbons. As engine operation progresses further, the influent to adsorbent zone 24 rises further in temperature and contains a reduced concentration of hydrocarbons, and therefore tends to desorb hydrocarbons from the adsorbent material therein. Accordingly, previously adsorbed hydrocarbons re-enter the exhaust gas stream and flow through exhaust pipe 26 to the second catalyst zone 28, which by then is better able to convert unburned hydrocarbons into innocuous substances.

Figure 2:
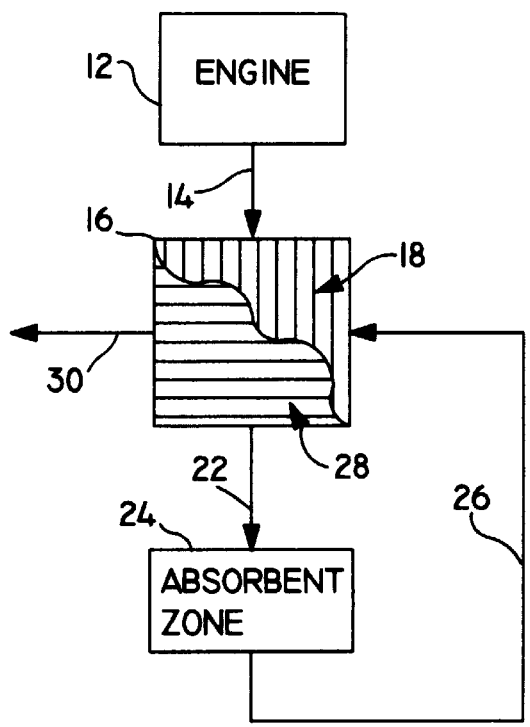
FIG. 2 is a schematic flow diagram of an exhaust treatment apparatus according to another embodiment of the present invention.

As previously discussed, heat exchanger 23 may comprise any conventional heat exchange member, or a heat exchange member comprising a crossflow monolith having first and second zones of gas flow passages therethrough. Preferably, as indicated above, the first and second zones of the crossflow monolith comprise the first catalyst zone and the second catalyst zone, respectively. Such an embodiment is illustrated in FIG. 2, wherein the exhaust from engine 12 flows through exhaust pipe 14 to a catalytic member comprising a crossflow monolith 16 having a first catalyst zone 18 therein. The exhaust gases flow through exhaust pipe 22, adsorbent zone 24 and then through exhaust pipe 26 in the same manner as described in connection with FIG. 1, and then flow again through crossflow monolith 16 wherein the second catalyst zone 28 is disposed in heat exchange relation to first catalyst zone 18. The exhaust gas is then discharged from monolith 16 to the atmosphere through exhaust pipe 30. As engine operation continues, one or both of the exothermic catalytic reactions in the first catalyst zone and the rise in temperature of the exhaust gas stream flowing from the engine cause heat to build up in the first catalyst zone 18. Due to the disposition of first catalyst zone 18 in the same crossflow monolith as second catalyst zone 28, at least some of the heat from the first catalyst zone 18 is transferred to second catalyst zone 28, thus enhancing the ability of the second catalyst therein to convert unburned hydrocarbons to innocuous substances. As the second catalyst thus becomes better able to convert unburned hydrocarbons, some of the heat from the first catalyst zone flows in the gas stream toward adsorbent zone 24 and begins to desorb hydrocarbons trapped therein. The desorbed hydrocarbons then flow to the second catalyst zone and are at least partially converted to innocuous substances.

Figure 3:
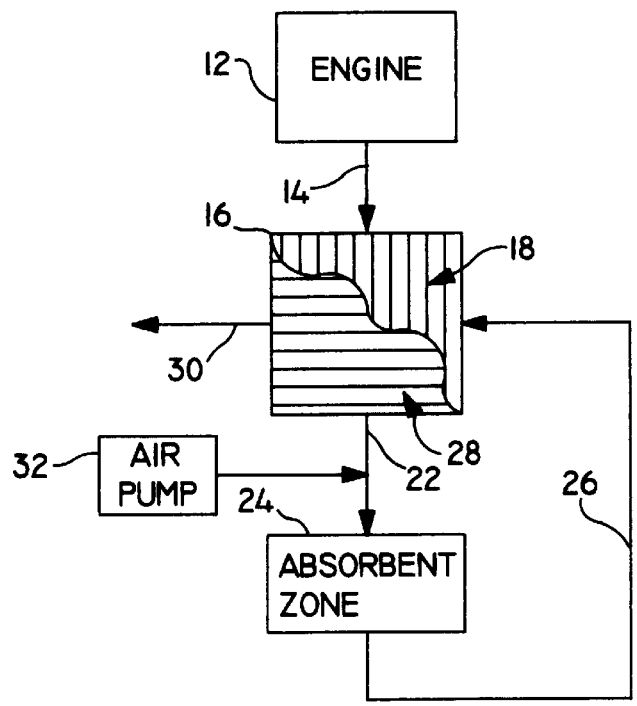
FIG. 3 is a schematic flow diagram of an exhaust treatment apparatus similar to that of FIG. 2 having an air pump inlet positioned between the catalytic member and the adsorbent zone, according to another embodiment of the present invention.

The embodiment of FIG. 3 is similar to that of FIG. 2 except that it includes an optional air pump 32 to add air to the exhaust gas stream flowing from monolith 16 to adsorbent zone 24 via exhaust pipe 22. The addition of air to the exhaust gas stream containing unburned hydrocarbon pollutants aids in the oxidation of these hydrocarbons in the second catalyst zone and also serves to cool adsorbent zone 24 to prevent the premature desorption of hydrocarbons. Those skilled in the art will appreciate that air is added because it is a readily available source of oxygen, and that oxygen or other oxidants may be added to the exhaust gas stream instead of, or in combination with air.

Figure 4:
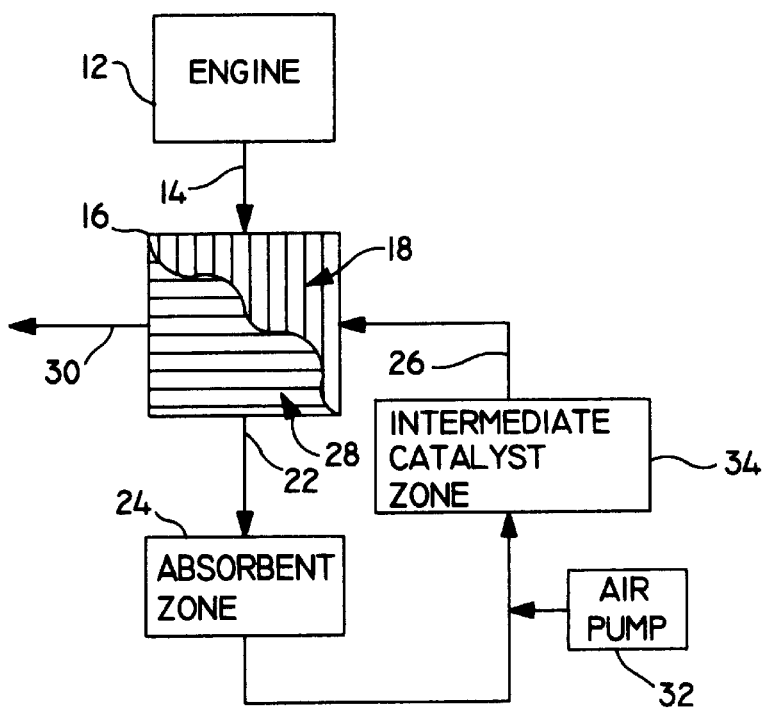
FIG. 4 is a schematic flow diagram of an exhaust treatment apparatus similar to that of FIG. 2 comprising an intermediate catalyst zone and an air pump inlet positioned downstream from the adsorbent zone according to another embodiment of the present invention.

The embodiment of FIG. 4 includes air pump 32 and intermediate catalyst zone 34, either or both of which may be added to the gas flow stream depicted in FIG. 2. Air pump 32 in FIG. 4 adds air to the gas stream at a point downstream from adsorbent zone 24 but upstream of intermediate catalyst zone 34. An oxidation catalyst (not shown) contained in intermediate catalyst zone 34 promotes the oxidation of hydrocarbon pollutants in the exhaust gas stream, aided by oxygen in the air injected by the air pump 32, and heats the exhaust gas stream because of the exothermic nature of the oxidation reaction. The exhaust gas is discharged from the intermediate catalyst zone 34 and flows through exhaust pipe 26 to second catalyst zone 28 in monolith 16, which thus receives heat from the intermediate catalyst zone as from the first catalyst zone.

Figure 5:
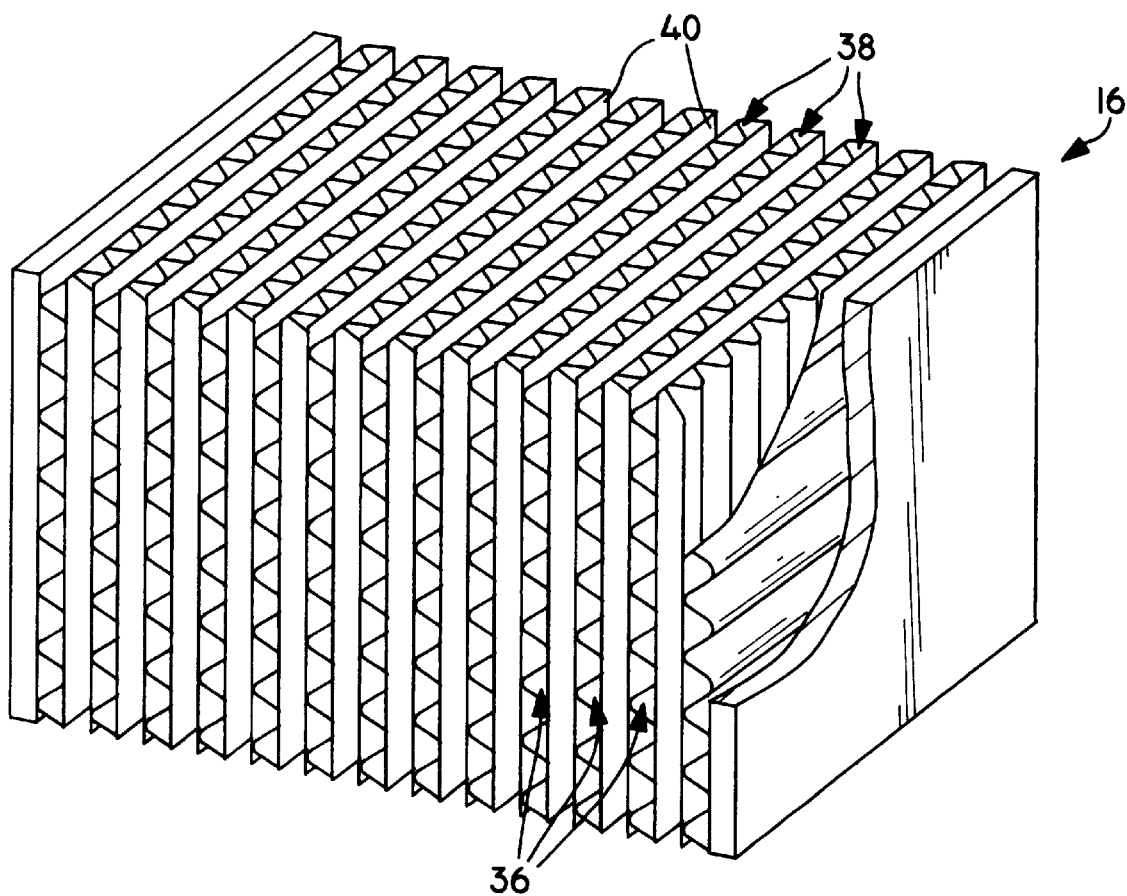
FIG. 5 is a perspective, partially cut away view of a crossflow monolith for use with one embodiment of the present invention.

A crossflow monolith useful in practicing the present invention is shown in FIG. 5 partly broken away to reveal horizontal passages 36 providing a first zone and vertical passages 38 providing a second zone, the passages of the first and second zones being disposed at right angles to one another. Passages 36 and 38 may be separated by a thin wall 40. This permits ready passage of heat from one set of passageways to another. Although not shown in the Figure, both passages 36 and 38 have a catalyst deposited therein.

Figure 6:
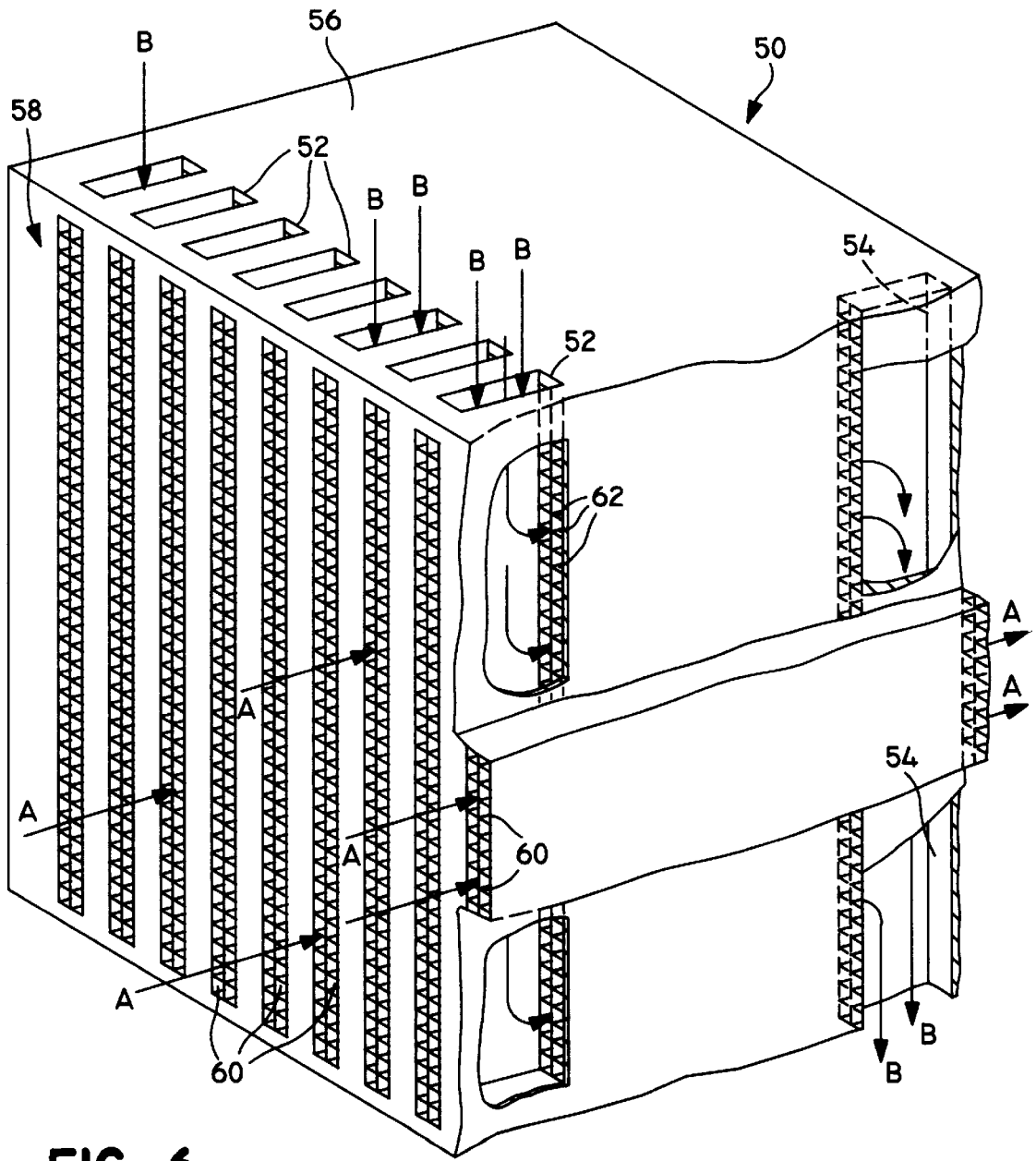
FIG. 6 is a schematic, partly broken away, perspective view of one embodiment of a crossflow monolith useful in the practice of the present invention.

An alternative "crossflow" monolith useful in the practice of the present invention is depicted in FIG. 6. Crossflow monolith 50 of FIG. 6 is a block of an extruded ceramic monolith having an array of parallel gas flow passages therethrough. The array of gas flow passages is divided into first and second pluralities of gas flow to provide first and second zones as follows. First, a first series of kerfs 52 is cut into the monolith block in a direction substantially parallel to the gas flow passages therein. As a result, the inlets of some of the gas flow passages in the monolith are recessed to points within the block. A second series of kerfs 54, only one of which is visible in FIG. 6, is cut into the block at the other ends of the truncated gas flow passages, i.e., in alignment with the first series of kerfs 52. The first series of kerfs 52 is closed off on the bottom surface of the block (not shown) and are left open at the top surface 56; the second series of kerfs 54 is sealed off at top surface 56 and left open at the bottom surface. In addition, the kerfs are sealed off on the front and back faces of the block, i.e., at front face 58 and at the rear face (not shown). Thus, the array of gas flow passages in crossflow monolith 50 is divided into a first plurality of gas flow passages 60, which are arranged in columns and which extend from the front face to the rear face of the block, and a second plurality of passages 62 which are truncated and have inlets and outlets disposed within the block due to the kerfs 52 and 54, which open to the top surface 56 and the bottom surface of the block. Thus, crossflow monolith 50 provides a first plurality of passages 60 comprising a first zone through which gases may flow from the front face to the rear face of the block as indicated by arrows A. The second plurality of passages 62 run parallel to gas flow passages 60 and are disposed in mutual heat exchange relation due to their close proximity. However, due to the disposition of the inlets and outlets of gas flow passages 62 within the block and because the series of kerfs is closed at the front face 58 and the rear face of the block and either at the bottom face or top face of the block, respectively, crossflow monolith 50 provides a second zone through which gases may flow, e.g., through top face 56 via kerfs 52, through passages 62 and out kerfs 54, as indicated by arrows B. Thus, the inlets and outlets of the respective first and second pluralities of passages are physically segregated so that gases may be flowed through the monolith selectively through the first zone or the second zone by use of manifolds placed either at the front and rear faces of the block or at the top and bottom faces of the block accordingly.

Figure 7A:
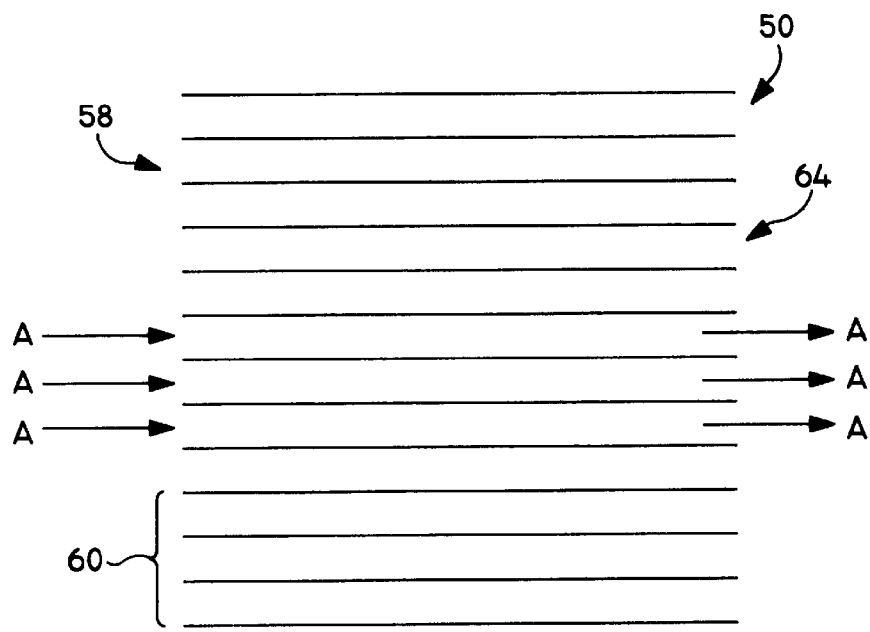
FIGS. 7A and 7B are schematic cross-sectional views of the crossflow monolith of FIG. 6.
Figure 7B:
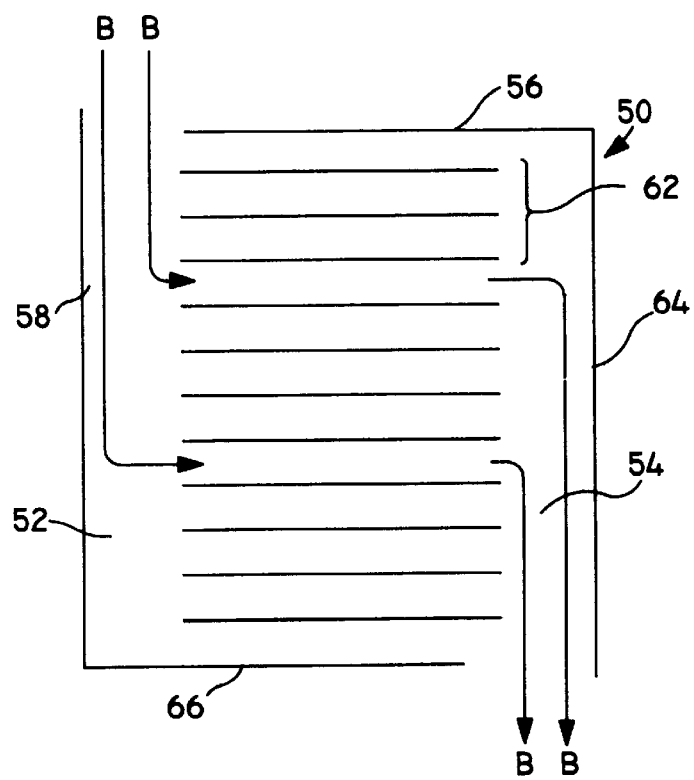

Schematic cross sections of monolith 50 are provided in FIGS. 7A and 7B. The schematic cross section of monolith 50 shown in FIG. 7A is taken along a vertical column of passages 60 which comprise the first zone. As previously described, passages 60 extend from front face 58 to rear face 64 of monolith 50 providing a flow path therethrough indicated by arrows A. A parallel cross section through a vertical column of passages 62 comprising the second zone is shown in FIG. 7B, in which it is clear that kerf 52 is sealed at front face 58 and at bottom face 66 of crossflow monolith 50. Similarly, kerf 54 is sealed at top face 56 and rear face 64, and is left open at bottom face 66, providing a flow path indicated by arrows B.

Preferably, before the array of passages in the ceramic monolith are segregated into first and second zones, all the gas flow passages in the monolith are coated with a three-way catalyst material by dipping the monolith in a washcoat slurry comprising a catalyst material, and drying and calcining the monolith in a conventional manner.

Figure 8:
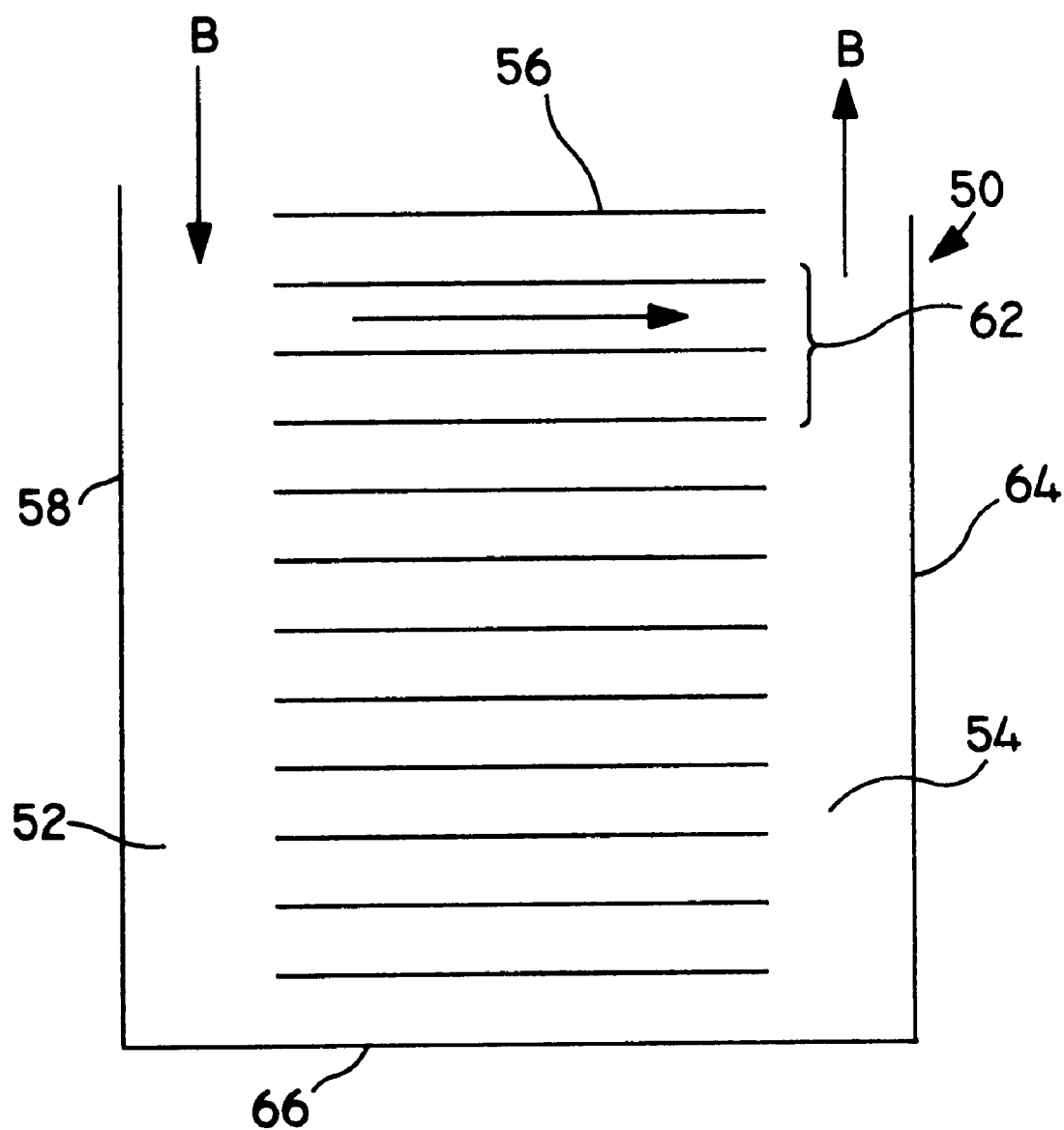
FIG. 8 is a schematic cross-sectional view of a variation on the crossflow monolith of FIG. 6.
Figure 9A:
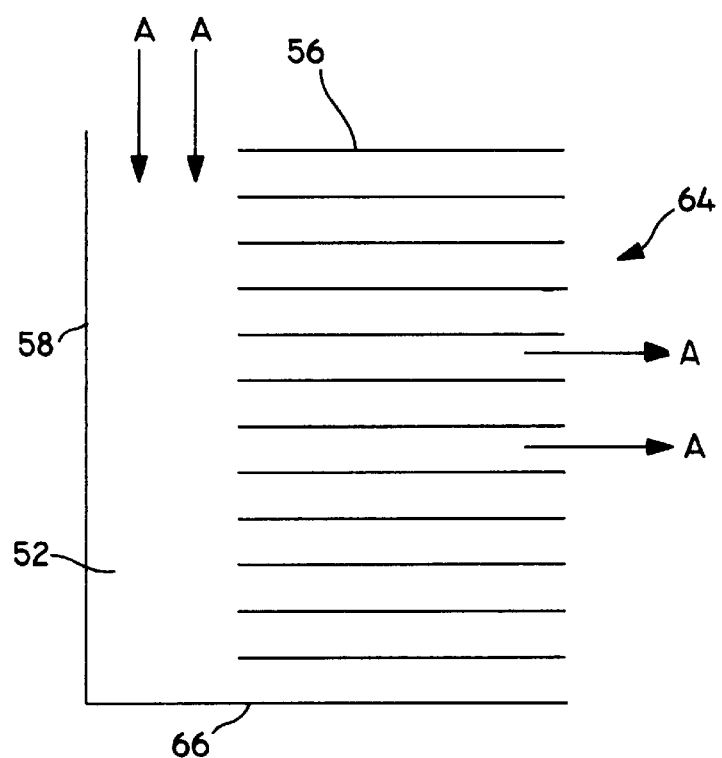
FIGS. 9A and 9B are schematic cross-sectional views of still another embodiment of a crossflow monolith useful in the practice of the present invention.
Figure 9B:
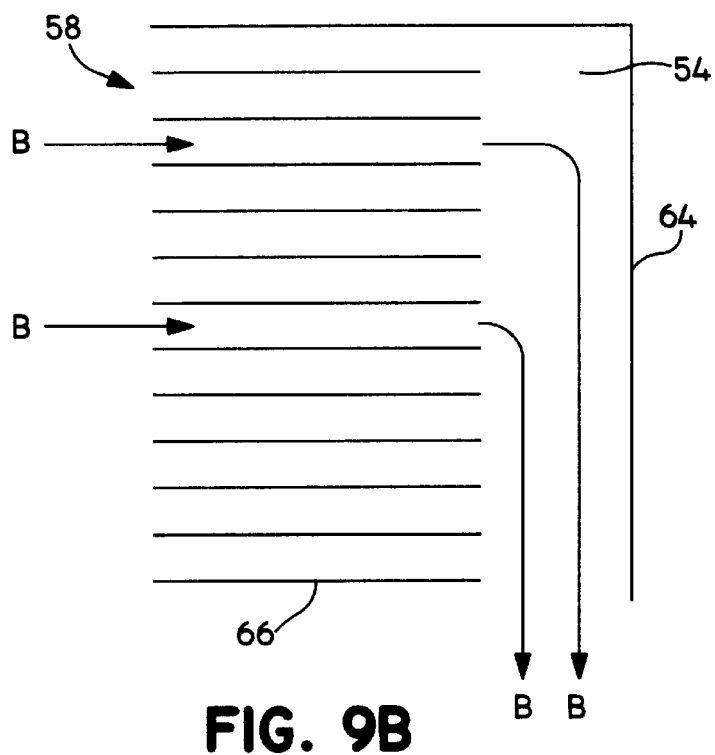

In an alternate embodiment shown in FIG. 8, kerfs 54, like kerfs 52, may be closed at bottom face 66 and open at top face 56. In still other embodiments, kerfs 54 may be staggered in relation to kerfs 52, as indicated by the spaced, parallel schematic cross sections of FIGS. 9A and 9B. As a result, the first zone indicated by flow arrows A may have an inlet at the top face 56 and an outlet at rear face 64, whereas the second zone, indicated by flow arrows B, may have an inlet at front face 58 and an outlet at bottom face 66. Other similar variations are also possible.

Figure 10:
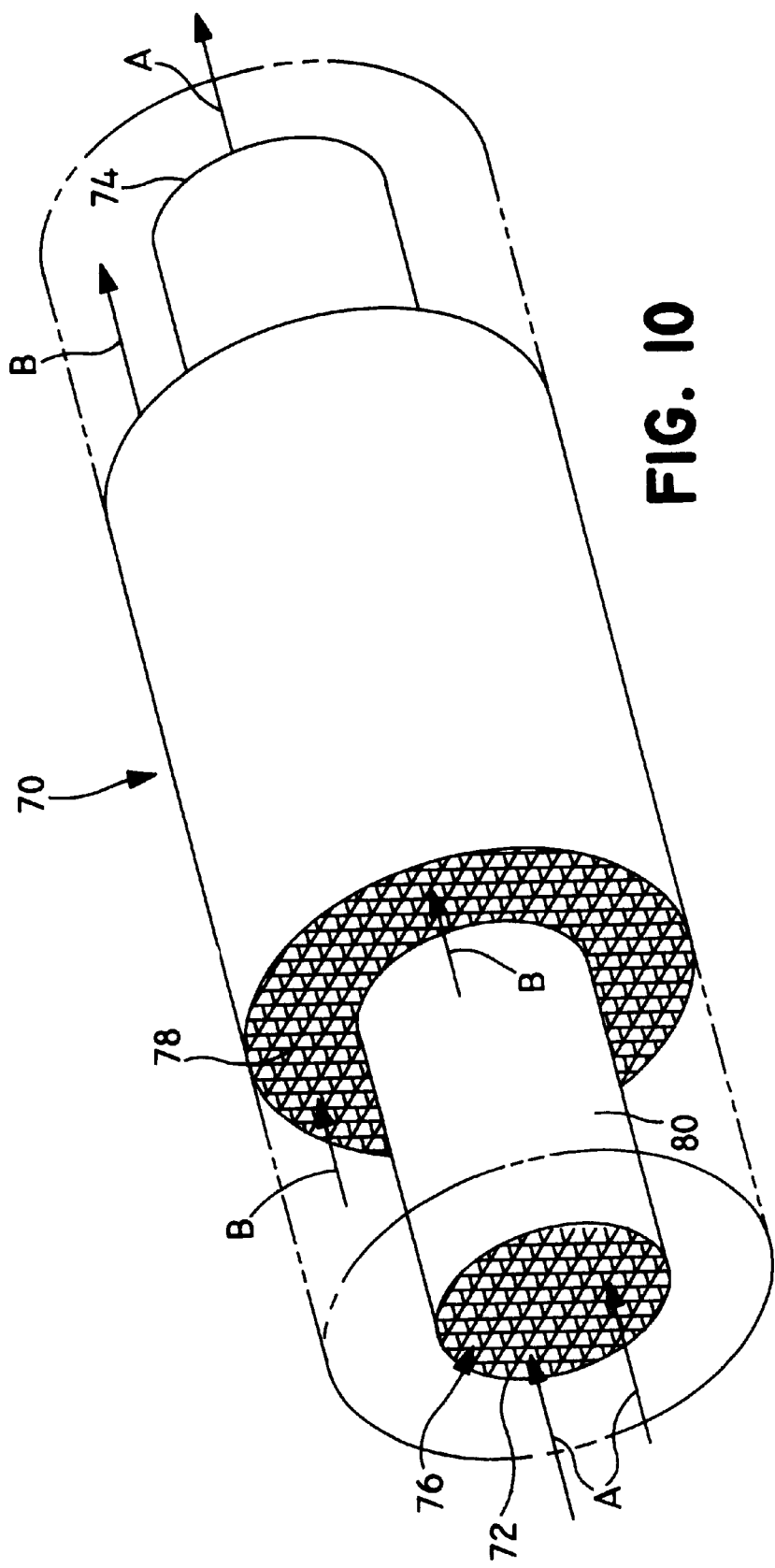
FIG. 10 is a perspective view of another embodiment of a crossflow monolith according to the present invention.

Monolith 70 of FIG. 10 embodies an alternative approach for segregating an array of parallel passages in a ceramic monolith into first and second zones. Monolith 70 is formed from a conventional cylindrical monolith having end faces 72 and 74, between which all of the passages run in parallel directions. Part of the cylindrical monolith is cut away, leaving a central longitudinal core comprising a first plurality of passages 76 which extend from end face 72 to end face 74. A second plurality of passages 78 is disposed in a collar shaped around configuration passages 76. Passages 78 are truncated relative to passages 76, and the inlets and outlets of passages 78 are thus physically segregated from those of passages 76. Therefore, a gas stream may be selectively flowed through one plurality or the other by means of a strategically designed manifold. Preferably, when monolith 70 is formed, the outer surface 80 of plurality of passages 76 is sealed to provide smooth, gas impervious closure which simplifies the use of a manifold therewith. Heat exchange between a gas stream. A flowing through plurality of passages 76 and 35 a gas stream B flowing through plurality of passages 78 is achieved because of the close relative proximity of the two pluralities of passages.

EXAMPLES

Example 1

Preparation of Adsorbent-coated Monoliths

A. A ball mill was charged with 545 g of H-ZSM-5 zeolite (silica/alumina ratio=50/1), 201.8 g of silica sol (28 weight percent silica) sold under the tradename NALCO ISJ612 and 888 g deionized water. The mixture was milled for 6 hours such that the particle size was 90 percent less than 8 microns. The slurry had a viscosity of 7 cps, a pH of 3.9, and solids content of 36.5 percent. To achieve a washcoat loading of about 2.0 g/in$^3$ (0.122 g/cc) each of two cordierite monoliths (each having a total volume of 55 in$^3$=0.9 liters and having 400 cpsi=62 cells per sq. cm) had to be coated twice with the slurry. After each coating, the monolith was dried at 110° C. for 16 hours, and then calcined at 450° C. for one hour.

B. Separately, a ball mill was charged with 650 g ammonium exchanged Beta zeolite (silica to alumina molecular ratio 35/1), 315 g of a silica sol binder sold under the tradename NALCO ISJ613 (22.8 percent solids, chloride-free), and 635 g deionized water. The mixture was milled for 7 hours, then 200 g deionized water was added and the milling continued. The resulting $NH_4^+$/Beta zeolite slurry had the following characteristics: pH 4.3, 28 percent solids; and a viscosity of 75 cps. To achieve a washcoat loading of about 2.0 g/in$^3$ (0.122 g/cc) each of two cordierite monoliths as described in Part A above had to be coated twice with the slurry. After each coating, the monolith was dried at 110° C. for 16 hours, and then calcined at 450° C. for one hour. Calcining converted the $NH_4^+$/Beta zeolite to H/Beta zeolite. H/Beta-based traps at silica/alumina ratios of 100 and 180 were prepared using the same procedure except that H/Beta zeolite prepared by a conventional acid extraction method was used as the starting material.

C. A slurry of 36 percent solids was generated by ball milling 2.5 percent Fe/Beta zeolite (5131 g), a silica sol solution sold under the tradename NALCO 1056 (1900 g at 35 weight percent solids), and water (balance). A cordierite monolith (400 cpsi; 62 cells per sq. cm) was twice coated with the slurry, dried at 110° C. for 16 hours, and then calcined at 450° C. for one hour to achieve a washcoat loading of about 2.0 g/in$^3$ (0.122 g/cc).

D. A slurry of 35 percent solids was formed by milling 900 g H/Mordenite (silica to alumina molecular ratio of 100), 333 g of a silica sol binder sold under the tradename NALCO 1056 (30 percent solids) and water (balance). Two cordierite monoliths (400 cpsi=62 cells per sq. cm) were twice coated with the slurry, dried each time at 110° C. for 16 hours, and then calcined at 450° C. for 1 hour thereby giving a washcoat loading of 2.0 g/cubic inch (0.122 g/cc). The volume of each coated piece was 55 cubic inches (0.9 liters).

Example 2

To show the effectiveness of the invention, vehicle tests were performed using a 1985 Volvo 740 GLE automobile having a 2.3 liter, four cylinder engine equipped with fuel injection. The vehicle was equipped with an exhaust gas treatment apparatus as illustrated schematically in FIG. 3, except that the air pump introduced air downstream of the adsorbent zone. The crossflow monolith was of the type illustrated in FIG. 6, and was formed from a ceramic block measuring about 6"×6"×6 (15.24 cm×15.24 cm×15.24 cm) and having parallel channels running therethrough at a density of 100 cells per cross sectional square inch (15.5 cells per sq. cm). Kerfs were cut into the block to group the cells in columns two cells wide. The monolith was coated with a catalyst washcoat comprising a standard three-way catalyst comprising platinum and rhodium in a ratio of 5:1, dispersed on a support material comprising stabilized alumina and ceria as an oxygen storage component. The catalyst loading was about 2 g/in$^3$, i.e., about 0.122 g/cc (dry basis), resulting in a precious metal content of about 40 g/ft$^3$, i.e., about 1.41 g/l. The exhaust gas treatment apparatus was subjected to the standard US-75 FTP (Federal Test Procedure) test in two separate trials, starting from a cold start each time. The test is described in CFR, Title 40, Part 86, Section 115-78. In one run, the adsorbent zone contained H-Beta zeolite adsorbent material having a silica/alumina ratio of 180:1 deposited upon two honeycomb monoliths (total volume=110 cubic inches [about 1.8 liters]) as described above in Example 1 to provide a loading of about 2 g/in3 (32.7 g/cm3) and had been aged for 100 hours at 750° C. in the exhaust stream of an eight-cylinder V-8 Chevrolet engine. The exhaust nominally comprised about 13.4% $CO_2$, 0.56% CO, 300–500 ppm hydrocarbons (on a Cl basis), 1700 ppm $NO_x$ 0.44% $O_2$, 12.5% water, 20 ppm $SO_2$ (volume basis), and $N_2$ (balance). In the other run, the adsorbent zone contained a honeycomb monolith which did not have any adsorbent material disposed thereon.

The chassis dynamometer used for the tests reported herein was a Clayton chassis dynamometer Model CE-50-0. The dynamometer was dual roll with 8.65 inch (21.97 cm) diameter rolls and a 20 inch (50.8 cm) roll spacing. The power absorption unit was 50 hp (37.3 kW). Water was used as the load circuit fluid.

Vehicle emissions were collected and measured using a Horiba Instruments, Inc. Vehicle Emissions testing System. Hydrocarbon emissions were measured by flame ionization using a Horiba Model FIA-23A total hydrocarbon analyzer with electronics module OPE-135. Carbon dioxide emissions were measured by using nondispersive infrared absorption using a Horiba Model AIA-23 NDIR analyzer with electronics module OPE-135. Oxides of nitrogen were measured by chemiluminescence using a Horiba Model CLA-22A with electronics module OPE-235. The ozone generator was Horiba Model OZG-UV-01. Oxygen was measured by paramagnetism using a Horiba Model MPA-21 analyzer with electronics module 35 OPE-335.

The total weight of non-methane hydrocarbon emissions ("NMHC") for the entire FTP test and for only the first cycle of the test, corresponding to cold-start operation were measured. The results are set forth below in TABLE I.

TABLE I

|  | Total FTP NMHC (g/mile) | NMHC During First Cycle* (g) |
|---|---|---|
| No Adsorbent Material | 0.233 (0.145 g/km) | 1.70 |
| Adsorbent Material | 0.161 (.1 g/km) | 0.84 |

*The first cycle corresponds to the first 125 seconds of the test.

Data provided in TABLE I show that a reduction of greater than 50 percent of NMHC emissions has been achieved during cold-start operation (First Cycle) using an apparatus according to the present invention in comparison to a similar apparatus without adsorbent material. For the entire FTP test cycle, nearly one-third reduction of NMHC was observed.

Example 3

Figure 11:
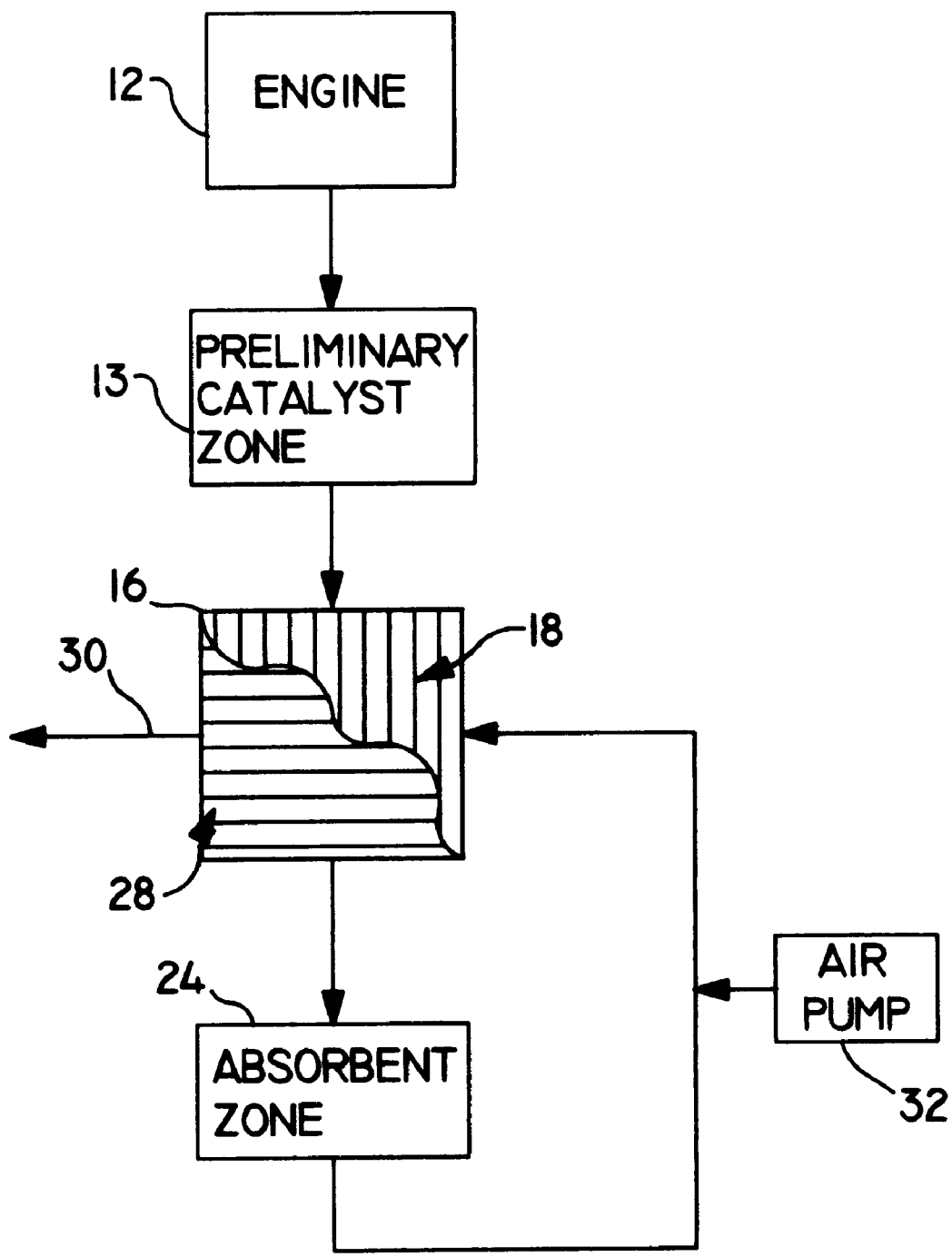
FIG. 11 is a schematic flow diagram of an exhaust treatment apparatus according to the present invention.

The test described in Example 2 was repeated, except that the exhaust treatment apparatus was modified in accordance with another embodiment of the invention illustrated schematically in FIG. 11. According to this embodiment, a preliminary catalyst zone 13 was disposed upstream of the crossflow monolith. Preliminary catalyst zone 13 contained a conventional oxidation catalyst composition comprising a palladium catalytic component comprising palladium dispersed on a monolithic metal support in an amount of about 100 g per cubic foot (i.e., about 3.53 g per liter). The support was generally cylindrical and about: 9 cm in diameter and 7.45 cm in length. Before being placed in the gas treatment apparatus used in this example, the preliminary catalyst was subjected to an aging cycle similar to that described for the aging of the adsorbent zone of Example 2, except that the aging was performed at 900° C. for 100 hours. In addition, air was injected into the gas stream in amounts sufficient to provide 10 volume percent of $O_2$ in the gas stream for 5 seconds after each minute of stoichiometric operation. In the exhaust apparatus of this example, the effluent from preliminary catalyst zone 13 was flowed into first catalyst zone 18 in the first zone of the crossflow monolith 16. As with the previous example of the invention, the effluent from the first zone of crossflow monolith 16 was flowed through adsorbent zone 24 (110 cubic inches=1.8 15 liters) and then through the second catalyst zone 28 disposed in the second zone of crossflow monolith 16.

The apparatus was tested in the same manner described in Example 2. As before, the total weight of non-methane hydrocarbon emissions ("NMHC") for the entire FTP test and only for the first cycle of the test, corresponding to cold-start operation, were measured. The results are set forth below in Table II.

TABLE II

|  | Total FTP NMHC (g/mile) | NMHC During First Cycle* (g) |
|---|---|---|
| No Adsorbent Material | 0.106 (= .0658 g/km) | 1.17 |
| Adsorbent Material | 0.065 (= .0404 g/km) | 0.44 |

*The first cycle corresponds to the first 125 seconds of the test.

The data provided in Table II demonstrate that with this alternative embodiment of the invention, a reduction of greater than 60% of NMHC emissions was achieved during cold-start operation (first cycle), which corresponds to an overall reduction of hydrocarbon emissions of greater 5 than 40 percent for the entire FTP test.

Example 4

To compare the trapping efficiency of the various materials coated onto monoliths in Example 1, two monoliths (providing a total volume of 110 in³ [1.8 liters]) were placed in the exhaust gas flow stream of an exhaust treatment apparatus comprising a three-way catalyst. The monoliths were tested for trapping efficiency using the vehicle and the first 505 seconds of the test procedure described above in Example 2. In this case, however, the vehicle was equipped with a conventional exhaust apparatus comprising only the adsorbent zone disposed downstream of a three-way catalyst zone. The Horiba equipment indicated in Example 2 was used to measure the composition of the exhaust at a point about six inches upstream of the inlet face of the adsorbent zone monolith and about six inches downstream of the exit face of the adsorbent zone monolith.

Hydrocarbon Trap Test Results

Trapping performance of the various adsorbent materials was measured by means of the First Cycle of the USFTP test. The trapping efficiency is defined by the following equation:

Trapping efficiency=100 [1.0—(HC outlet mass emission/HC inlet mass emission)]

A summary of results for various trap materials is reported in TABLE III.

TABLE III

Trapping Efficiency at the Tailpipe Position on the Volvo

| Trap Washcoat Material[a] | Trapping Efficiency[b] |
|---|---|
| H/ZSM-5 (50/1) | 25.1 |
| Fe/Beta (35/1) | 25.3 |
| H/Beta (35/1)[c] | 21.9 |
| H/Beta (100/1) | 49.1 |
| H/Mordenite (100/1) | 34.8–2.0[d] |
| H/Beta (180/1) | 55.6 |

[a]Figures in parentheses indicate the silica/alumina ratio of zeolite.
[b]Trapping efficiency of HC's during the First Cycle of the US-75 FTP test. The trap was located in the low temperature tailpipe position on the Volvo 740 GLE. The results represent average values obtained in at least two separate trials on consecutive days.
[c]Produced by calcining $NH_4^+$ - exchanged Beta zeolite.
[d]Trapping efficiency fell from 34.8% on the first day to 6.6% on the second day to 2.0% on the third day.

The data of TABLE III show that Beta zeolites exhibit superior trapping efficiency in comparison to a conventional ZSM-5 zeolite, since comparable performance was exhibited between Beta zeolites having silica/alumina ratios of 35/1 and the ZSM-5 having a silica/alumina ratio of 50/1. In addition, the Beta zeolites performed well through subsequent test cycles, whereas the trapping efficiency of mordenite fell to unacceptable levels after the initial cycle.

Example 5

H Beta zeolite, having a silica to alumina ratio of about 35/1, was acid leached using three thousand grams of H Beta zeolite solids dispersed in 9600 grams of deionized water. Twenty-four hundred grams of concentrated sulfuric acid (95–98%) was slowly added to the dispersion. The dispersion was boiled for 45 minutes; filtered; cooled to room temperature; washed free of sulfate anions with deionized water; and dried at 110° C. The leached zeolite was then ball milled such that 90% of the particles were less than 8 murons. The acid leached zeolite had a silica to alumina ratio ranging from 170 to 240. The reference material used to assess the realtive Bronsted acidity had silica to alumina ratio of 180/1.

Samples of the acid leached Beta zeolite were then steamed for twenty-four hours at 550° C., 650° C., 750° C. and 850° C. Additional samples of the acid leached Beta zeolite which were steamed for twenty-four hours at 650° C. and 750° C. and were then acid leached again according to the recited procedure for the first acid leaching.

Bronsted and Lewis acid site concentrations were measured by Infra-red spectroscopic adsorption peaks using a Perkin-Elmer 1750 FTIR spectrometer. Approximately 0.5 grams of sample was placed in a Spectra Tech Environmental chamber cell and examined in-situ under constant nitrogen flow. The sample was initially heated to 450° C. to remove all water. The sample was cooled to 40° C. and pyridine was bubbled under nitrogen flow into the chamber. The sample was kept at 40° C. for 50 minutes to reach equilibrium. Next the sample was heated under a nitrogen flow to 200° C. for one hour, cooled, and scanned to take measurements of the 1546 cm$^{-1}$ peak for a Bronsted acid and the 1455 cm$^{-1}$ peak for a Lewis acid. The relative Bronsted acidity was determined by a ratio of the Bronsted acidity structure peak heights after treatment to before treatment. The relative Lewis acidity was determined by a ratio of the Lewis acidity structure peak heights after treatment to before treatment.

Measurements were conducted only for the above samples of the Beta zeolite which were first acid acid leached followed by steam treatment. The control sample was acid leached to give a silica to alumina ratio of about 180/1. Crystallinity loss of samples which were leached followed by steaming at 650° C., 750° C. and 850° C. for 24 hours was measured using X-ray diffraction. Results are summarized in Table IV below:

TABLE IV

| STEAM TEMP. (° C.) | Relative IR Peak Intensity Bronsted | Lewis | CRYSTALLINITY LOSS (%) |
|---|---|---|---|
| — | 1* | 1 | 0 |
| 550 | 0.29 | 0.75 | — |
| 650 | 0.099 | 0.11 | Little - None |
| 750 | 0.019 | 0.68 | ~30% |
| 850 | 0.007 | 0.47 | ~50% |

*Reference

Example 6

The effect of acid leaching and steaming treatment of H Beta zeolite was studied in this Example. The silica to alumina molar ratio was determined by chemical analysis using X-ray fluorescence spectroscopy. The reduction of acidity is indicated by the amount of pyridine adsorbed. The amount of pyridine adsorbed was based on Thermal Gravimetric Analysis (TGA). Samples of about 15 milligram were dried to 500° C. for 20 minutes in a He stream. The temperature was cooled to 200° C. in about 15 to 20 minutes. With the sample at 200° C., He was bubbled through a pyridine saturator at ambient temperature and was passed through the sample for 20 minutes to adsorb on to the sample. The pyridine was turned off, and the stream of He was then passed through the sample at 200° C. to remove excess pyridine. The amount of pyridine adsorbed was determined by weight gain of the sample. Samples tested included untreated Beta zeolite; Beta zeolite acid leached according to the procedure in Example 5; Beta zeolite acid leached twice in accordance with the procedure of Example 5; Beta zeolite leached with 2 molar oxalic acid; Beta zeolite acid leached according to the procedure of Example 5, steamed at 750° C. followed by a repeat of the acid leaching; and the latter experiment repeated except that the steaming was conducted at 650° C. The results are summarized on TABLE V.

TABLE V

| Treatment | SiO$_2$/Al$_2$O$_3$ | Pyridine Ads $\mu$ mol/g |
|---|---|---|
| None | 32 | 710 |
| H$_2$SO$_4$ Leach | 218 | 300 |
| 2 × H$_2$SO$_4$ | 259 | 210 |

TABLE V-continued

| Treatment | SiO$_2$/Al$_2$O$_3$ | Pyridine Ads $\mu$ mol/g |
|---|---|---|
| Oxalic Acid Leach | 468 | 170 |
| H$_2$SO$_4$ Leach 750° C. Steam H$_2$SO$_4$ Leach | 259 | 70 |
| H$_2$SO$_4$ Leach 650° Steam H$_2$SO$_4$ Leach | 301 | 60 |

Examples 7, 8

A cordierite monolith honeycomb, 3.18 inches by 6.68 inches by 3.0 inches long and having 400 square cells per square inch was coated with a slurry made from a composition consisting of 3,497 grams of Beta zeolite from Example 5 having a silica to alumina ratio of about 200; 6111 grams of water and 1,297 grams of a suspended colloidal silica binder obtained as silica sol Product No. 1056 from Nalco Corp.

The coated honeycomb was then calcined at 450° C., the weight of the calcined honeycomb was 458.7 grams, indicating a washcoat of 55.7 grams. A second coat was applied by immersion in a diluted slurry formulated by using the remains of the initial slurry composition, with a solids content of 32 wt. %, and adding water sufficient to reduce the solids content to 27 wt. %. After drying and calcining as described above, the total washcoat (first and second coats) was measured to be about 108 grams. Two honeycomb bricks were made and used as Comparative 1.

Example 7 and 8 honeycombs were prepared in the same manner as that used in Comparative 1, except that prior to coating the honeycomb the Beta zeolite was treated in an atmosphere of air with 60% steam for 24 hours at 650° C. (Example 7) and 750° C. (Example 8). These honeycombs had coatings ranging from about 98 grams to about 108 grams.

The three coated sets of two honeycomb bricks each of Comp. 1 and Examples 7 and 8, were housed in a conventional canister useful for catalytic converters for automotive applications and mounted in the tailpipe position of a Volvo 740GLE automobile. The adsorption efficiencies for the adsorption of hydrocarbon were measured for Cycle 1, of the first 125 seconds of the US 75 FTP test. The honeycombs were then aged for 12 hours during which raw engine exhaust flowed through them with the engine adjusted to provide stoichiometric (oxidants and reductants in balance) exhaust at 350° C. and 450° C. Following this, the Cycle 1 adsorption efficiencies of the coated honeycombs were 450° C. reevaluated.

The results presented in TABLE VI show that steam treatment substantially decreases the Bronsted acidity of the zeolite. The hydrocarbon adsorption efficiencies (FTP test, Cycle 1) show a moderate increase due to steaming. The benefit of steam treatment, however, is clearly shown by comparing these efficiencies after engine aging.

TABLE VI

| Zeolite Steam Temp (° C.) | Relative Bronsted Acidity | Total HC Adsorption Efficiency - Cycle 1 (%) | | |
|---|---|---|---|---|
| | | Fresh | Aged @ 350° C. | Aged @ 450° C. |
| None | 1 | 44 | 9 | 4 |
| 650 | 0.099 | 50 | 50 | 48 |
| 750 | 0.019 | 54 | 52 | 53 |

Example 9

One and one half inch diameter and three inch long cylindrical cores were removed from honeycombs as described in Examples 7 and 8. Compositions of samples of Beta zeolites from Examples 5 and 6 having about ten percent by weight of the silica sol of the type used in Example 7 and 8 were coated onto honeycomb substrate cores. The Beta zeolites used were all acid leached with about twenty percent aqueous sulfuric acid. Samples used included a singly leached sample, a doubly leached sample, and singly leached samples followed by steam treatment at 550° C., 650° C., 750° C., and 850° C. The coatings were about 2 g/in$^3$. A gas at 50–54° C. containing 10% water, 1.6–5.5% oxygen, 1,500 ppm NOx, 4,500 ppm CO, 50 ppm SO$_2$, and 186 ppm heptane was passed through the honeycomb cores at a space velocity of 15,000 reciprical hours. The amount of heptane adsorbed was determined by measuring the inlet and outlet concentrations of heptane using a flame conization detector. The curve inlet and outlet concentrations of heptane versus time were measured and the difference between the two curves is integrated. Results are summarized on TABLE VII below.

TABLE VII

| Treatment | Heptane Adsorption Capacity[1] (CC) |
|---|---|
| SAL | 41–51 |
| 2 × SAL | 49 |
| SAL + 550 - STM | 67 |
| SAL + 650 - STM | 122 |
| SAL + 750 - STM | 94–99 |
| SAL + 850 - STM | 59 |

[1]CC nC$_7$ adsorbed onto 3" core, coated (2 g/in$^3$) with treated zeolite beta; adsorption @ 50–54° C., gas contains 10% H$_2$O, 1.6–5.5% O$_2$, 1,500 ppm NO$_x$, 4,500 ppm CO, 50 ppm SO$_2$, 186 ppm nC$_7$, SV = 15,000 hr$^{-1}$
SAL - Standard Acid Leach, STM - Steam treated While the invention has been described in detail with reference to particular embodiments thereof, it will be apparent that upon an understanding of the foregoing, numerous alterations to the described embodiments will occur to those skilled in the art and it is intended to include such alterations within the scope of the appended claims.

What is claimed is:

1. An exhaust gas purifying apparatus for converting noxious components such as hydrocarbons and other pollutants from an engine exhaust gas into innocuous products, the apparatus comprising:
   a flow path for conveying engine exhaust gases containing hydrocarbons and other pollutants from an engine and comprising;
   a first catalyst zone in the flow path and downstream of the engine comprising a first catalyst effective for the conversion of at least some of the other pollutants into innocuous substances,
   an adsorbent zone disposed in the flow path in gas flow communication with and downstream of the first catalyst zone and comprising an adsorbent, which comprises H Beta zeolite material havina a relative Bronsted acidity of less than 0.5, for adsorbing at least some hydrocarbons in the engine exhaust gas, at least during a cold-start period of engine operation, and
   a second catalyst zone disposed in gas flow communication with and downstream of the adsorbent zone and comprising a second catalyst for at least converting unburned hydrocarbons into innocuous substances; and
   heat exchange means disposed in a heat transfer relation between the first catalyst zone and the second catalyst zone for providing heat transfer by indirect heat exchange from the first catalyst zone to the second catalyst zone.

2. The apparatus of claim 1 wherein the heat exchange means comprises a heat exchanger.

3. The apparatus of claim 1 wherein the heat exchange means comprises a crossflow monolith comprising a first heat exchange zone and a second heat exchange zone, the first heat exchange zone comprising a first plurality of passages in the flow path establishing a first flow path through the monolith and located downstream of the first catalyst zone and the second heat exchange zone comprising a second plurality of passages in the flow path establishing a second flow path through the monolith and located upstream of the second catalyst zone, the first plurality of passages not providing gas flow communication with the second plurality of passages but being disposed in heat exchange relation thereto, whereby the exhaust gas flowing through the first heat exchange zone is in indirect heat exchange relation with, but does not comingle with, the exhaust gas in the second heat exchange zone.

4. An exhaust gas purifying apparatus for converting noxious components such as hydrocarbons and other pollutants from an engine exhaust gas into innocuous products, the apparatus comprising:
   a flow path for conveying engine exhaust gases containing hydrocarbons and other pollutants from an engine and comprising;
   a first catalyst zone in the flow path and downstream of the engine comprising a first catalyst effective for the conversion of at least some of the other pollutants into innocuous substances,
   an adsorbent zone, comprising H Beta zeolite material having a relative Bronsted acidity of less than 0.5, disposed in the flow path in gas flow communication with and downstream of the first catalyst zone and comprising an adsorbent for adsorbing at least some hydrocarbons in the engine exhaust gas, at least during a cold-start period of engine operation, and
   a second catalyst zone disposed in gas flow communication with and downstream of the adsorbent zone and comprising a second catalyst for at least converting unburned hydrocarbons into innocuous substances; and
   heat exchange means disposed in a heat transfer relation between the first catalyst zone and the second catalyst zone for providing heat transfer by indirect heat exchange from the first catalyst zone to the second catalyst zone, wherein the heat exchange means comprises a crossflow monolith comprising a first heat exchange zone, the first heat exchange zone comprising the first catalyst zone, and a second heat exchange zone, the second heat exchange zone comprises the second catalyst zone.

5. The apparatus of claim 1 or claim 4 wherein the first catalyst is a catalyst effective at least for the oxidation of carbon monoxide.

6. The apparatus of claim 5 wherein at least one of the first and second catalysts comprises a three-way catalyst.

7. The apparatus of claim 5 wherein the first catalyst comprises a three-way catalyst.

8. The apparatus of claim 1 further comprising an intermediate catalyst zone disposed between, and in gas flow communication with, the adsorbent zone and the second catalyst zone, the intermediate catalyst zone comprising a third catalyst effective at least for the oxidation of hydrocarbons.

9. The apparatus of claim 1 or claim 8 further comprising means for adding an oxidant to the engine exhaust gas at a point upstream of the second catalyst zone.

10. The apparatus of claim 1 or claim 8 further comprising means for adding an oxidant to the exhaust gas at a point between the first and second catalyst zones.

11. The apparatus of claim 8 further comprising means for adding an oxidant to the exhaust gas at a point upstream of the intermediate catalyst zone.

12. The apparatus of claim 8 further comprising means for adding an oxidant to the exhaust gas at a point between the first and second catalyst zones and downstream of the adsorbent zone.

13. The apparatus of claim 4 wherein the crossflow monolith is dimensioned and configured to provide a geometric surface area per unit volume of from about 3 to 35 $cm^2/cm^3$ in the first heat exchange zone and a geometric surface area per unit volume of from about 3 to 35 $cm^2/cm^3$ in the second heat exchange zone.

14. The apparatus of claim 13 wherein the crossflow monolith is dimensioned and configured to provide from about 9 to 800 gas flow passages per cross-sectional square inch in the first heat exchange zone and from about 9 to 800 gas flow passages per cross-sectional square inch in the second heat exchange zone.

15. The apparatus of claim 1 or 4 wherein the adsorbent zone further comprises an additional molecular sieve material.

16. The apparatus of claim 15 wherein the additional molecular sieve material comprises one or more materials selected from the group consisting of faujasite, chabazite, silicalite, zeolite X, zeolite Y, and offretite.

17. The apparatus of claim 4 wherein the H Beta zeolite material has a silica/alumina ratio of from about 25/1 to about 300/1.

18. The apparatus of claim 17 wherein the Beta zeolite material has a silica/alumina ratio of from about 35/1 to about 180/1.

19. The apparatus of claim 17 wherein the Beta zeolite material has a silica/alumina ratio of from about 100/1 to about 250/1.

20. The apparatus of claim 1, claim 3 or claim 4, further comprising a preliminary catalyst zone disposed upstream of and in gas flow communication with the first catalyst zone.

21. The apparatus of claim 20 wherein the preliminary catalyst zone comprises a catalyst composition comprising a palladium catalytic component.

22. The apparatus of claim 15 wherein the additional molecular sieve material comprises a zeolite having a relative Bronsted acidity of less than 0.5.

23. The apparatus of claim 22 wherein the zeolite material comprises a H Beta zeolite material having a relative Bronsted acidity of less than 0.25.

24. The apparatus of claims 1 or 4 wherein the H Beta zeolite material comprises a silica to alumina molar ratio of at least 25 to 1.

25. The apparatus of claim 24 wherein the H Beta zeolite material has a silica to alumina molar ratio of from about 200 to 1 to about 1000 to 1.

* * * * *